United States Patent
Mead

(10) Patent No.: US 7,849,418 B2
(45) Date of Patent: Dec. 7, 2010

(54) SEGREGATION OF REDUNDANT CONTROL BITS IN AN ECC PERMUTED, SYSTEMATIC MODULATION CODE

(75) Inventor: John P. Mead, Longmont, CO (US)

(73) Assignee: Broadcom Corporation, Irvine, CA (US)

(*) Notice: Subject to any disclaimer, the term of this patent is extended or adjusted under 35 U.S.C. 154(b) by 523 days.

(21) Appl. No.: 11/972,684

(22) Filed: Jan. 11, 2008

(65) Prior Publication Data

US 2008/0178061 A1 Jul. 24, 2008

Related U.S. Application Data

(63) Continuation-in-part of application No. 11/694,985, filed on Mar. 31, 2007.

(60) Provisional application No. 60/788,271, filed on Mar. 31, 2006.

(51) Int. Cl.
 *H03M 13/00* (2006.01)
(52) U.S. Cl. .................. 715/784; 714/758; 714/785
(58) Field of Classification Search .............. 714/758, 714/784, 785
 See application file for complete search history.

(56) References Cited

U.S. PATENT DOCUMENTS

| | | | | |
|---|---|---|---|---|
| 5,506,903 A | * | 4/1996 | Yamashita | 380/216 |
| 5,983,383 A | * | 11/1999 | Wolf | 714/755 |
| 6,229,129 B1 | * | 5/2001 | Yoshida | 219/702 |
| 6,553,538 B2 | * | 4/2003 | Zehavi | 714/784 |
| 7,020,828 B2 | * | 3/2006 | Birru | 714/792 |
| 7,050,419 B2 | * | 5/2006 | Azenkot et al. | 370/347 |
| 7,072,387 B1 | * | 7/2006 | Betts | 375/219 |

* cited by examiner

*Primary Examiner*—Esaw T Abraham
(74) *Attorney, Agent, or Firm*—Garlick Harrison & Markison; Shayne X. Short

(57) ABSTRACT

Segregation of redundant control bits in an ECC permuted, systematic modulation code. Appropriately encoding of user information via combined modulation and RS (Reed-Solomon) encoding ensures segregation of scrambled user information, modulation redundancy bits, and RS redundancy bits in such a way that each of the components thereof are segregated and stored within any desirable digital information memory storage device. By providing this segregated capability, when accessing a portion of a RS codeword from the memory, an entire RS codeword need not be read from the memory. In fact, only the particular field (or bits) needs to be accessed to perform correction thereon. This segregation provides for a reduction in the hardware complexity of translation between user information and a modulation codeword. Also, this segregation provides for the ability to perform correction of only one of the scrambled user information, the modulation redundancy bits, or the RS redundancy bits.

20 Claims, 19 Drawing Sheets

SEGREGATION OF REDUNDANT CONTROL BITS IN AN ECC PERMUTED, SYSTEMATIC MODULATION CODE

CROSS REFERENCE TO RELATED PATENTS/PATENT APPLICATIONS

Continuation-in-part (CIP) priority claim, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility application Ser. No. 11/694,985, entitled "Segregation of redundant control bits in an ECC permuted, systematic modulation code," filed Mar. 31, 2007, pending, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/788,271, entitled "Segregation of redundant control bits in an ECC permuted, systematic modulation code," filed Mar. 31, 2006.

BACKGROUND OF THE INVENTION

1. Technical Field of the Invention

The invention relates generally to encoding and/or decoding of information; and, more particularly, it relates to segregation of portions of coded signal employed in accordance with such encoding and/or decoding.

2. Description of Related Art

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. FIG. 1 depicts a pattern of radially-spaced concentric data tracks 12 within a disk 10. Data stored on the disks may be accessed by moving RW heads radially as driven by a head actuator to the radial location of the track containing the data. To efficiently and quickly access this data, fine control of RW hard positioning is required. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

Within such hard disk drives (HDDs), error correction coding (ECC) is sometimes employed to ensure the ability to correct for errors of data that is written to and read from the storage media of a HDD. The ECC allows the ability to correct for those errors within the error correction capability of the code.

In disk drive controllers, disk drive modulation codes are often reverse-ordered (permuted) with the ECC system in order to eliminate the problem error propagation of large and efficient modulation code words, which could cause multiple ECC symbol corruption. Reversing the order of the modulation code encoder decoder (ENDEC) and the ECC system causes several issues that are difficult and costly to deal with in the hard disk drive controller. These disk drive controllers may be single-chip (SoC) or multi chip solutions. Reverse order ECC modulation may be performed to reduce error propagation. In multi chip solutions this may be achieved by moving.

Additionally RLL (Run Length Limiting) mode of the ENDEC is limits the run length of ones, zeros, or the two Nyquist (repeating "01" or "10") patterns in the signal transmitted by the read channel within longitudinal recordings. The RDS (Running Digital Sum) mode for perpendicular recording limits the DC content of the signal. An RDS code will also suffice as an RLL code since controlling the DC content of a signal will always limit the run length. However, due to the rate of the RDS code, there is an unnecessary penalty for using it with a longitudinal recording channel. Hence, a nearly unity rate RLL code is provided. When an RLL or RDS encode is performed chronologically following the ECC encoding, the RLL/RDS decoding must be performed prior to the ECC decoding. For a system that performs the named operations in this order, there will be some degradation in the effectiveness of the ECC system due to error propagation. For this reason, the RLL/RDS ENDEC is also reverse ordered with the ECC.

With modulation codes, such as RLL/RDS, the redundant bits are only used for decoding purposes. (i.e., the redundant bits do not have any component of the user data embedded within them). However, encoding these redundant bits can result in decoding errors should an error be propagated within the encoding and decoding of these bits. Such an error may be propagated throughout the encoded data, corrupting the data beyond the capabilities of the ECC scheme.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
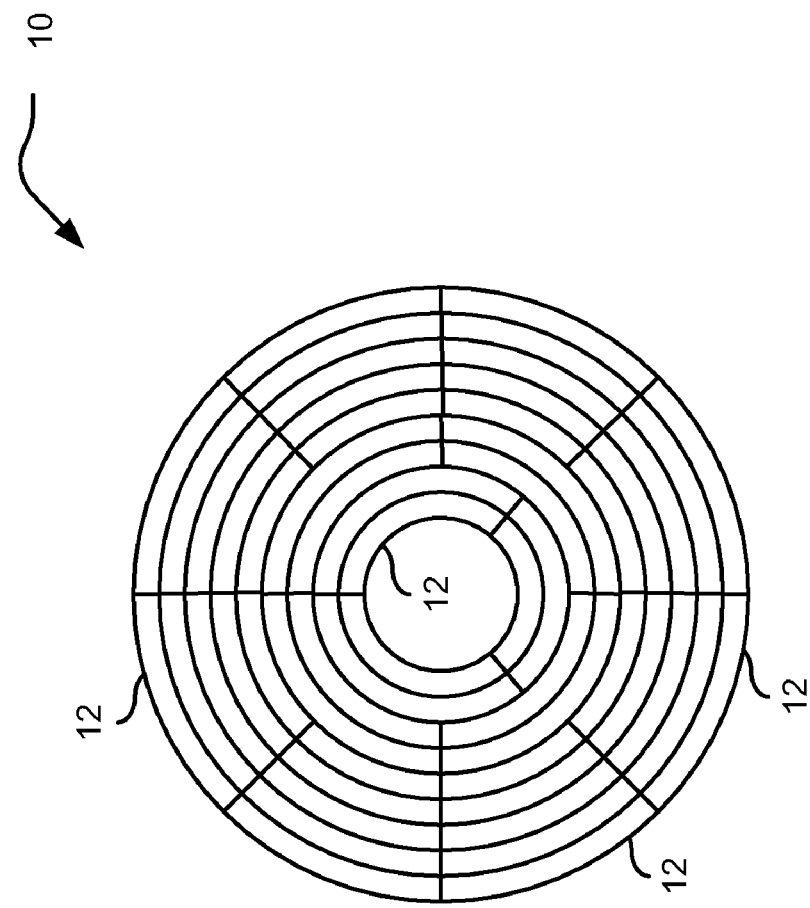
FIG. 1 depicts a prior art pattern of radially-spaced concentric data tracks within the magnetic media of a disk.

A novel means is presented herein by which modulation encoding (in accordance with encoding as performed within memory storage devices such as hard disk drives (HDDs)) is combined with error correction code (ECC) encoding (e.g., RS (Reed-Solomon) encoding) and the resulting codewords generated thereby are segregated. This allows for storing of these various components within different locations of the memory and/or storage media.

In single-chip (SoC) disk drive controllers, it is a trend for the disk drive modulation codes to be reverse-ordered (permuted) with the ECC system in order to eliminate the problem error propagation of large and efficient modulation code words, which can otherwise cause multiple ECC symbol corruption.

However, reversing the order of the modulation code ENDEC and the ECC system causes several issues that are difficult and costly to deal with in the hard disk drive controller. More specifically, some of these complications in the controller can include the following:

(1) Increasing the number of bits that are passed through the controller data path and stored in the sector buffer adds a significant amount of area, power and complexity to the design if it is done "in line" with the data. This is because the data path may be very wide and transfer data at fairly high rates in this segment of the disk drive controller (on the host-side of the sector buffer). Depending on the modulation code, this data translation may require a very large barrel shifter running at a high frequency, to accomplish the task.

(2) In some test modes, the controller needs the ability to read data from the media and determine exactly which user bits were flipped on the media. This may include but is not limited to long read and write operations. With systematic codes, small errors in the redundant information bits will cause large bursts of corruption in the user data.

(3) If S/W ECC correction is to be performed in the main buffer, it is very difficult to correct the data since correcting the redundant bits affects the entire code word.

With systematic modulation codes, the redundant bits are only used for decoding purposes (i.e., they do not have any component of the user data embedded in them). For these types of codes, it is feasible to segregate the redundant bits and transfer them separate from the encoded user data.

This novel approach presented herein allows for storing of the redundant information separately and contiguous with the encoded user data such that all the redundant information is co-located (e.g., located in separate locations). This approach also provides for the ability to define boundaries in the ECC system such that the redundant information can be corrected independently from the encoded user data (e.g., the user data as scrambled by a modulation code). By providing this ability, several controller-related issues are resolved.

Segregation of redundant bits in accordance with embodiments of the present invention facilitates the storage and retrieval of user data. By integrating both error correction capabilities (ECC) and systematic coding within the disk controller, the potential to propagate errors of encoded data is significantly reduced. Unlike prior schemes which encoded modulation code control bits with the user data, embodiments of the present invention separate the encoded user data and the redundant control bits. In this way the redundant control bits can be recovered, (this may involve the application of an error control scheme) to ensure that the proper redundant control bits are recovered. Then these redundant control bits may be used to process the encoded user data and CRC or ECC bits. This segregation of the redundant control bits helps to ensure: that; (1) data is not lost when improper modulation coding bits are not recovered; or (2) the propagation of errors throughout the encoded user data.

Figure 2:
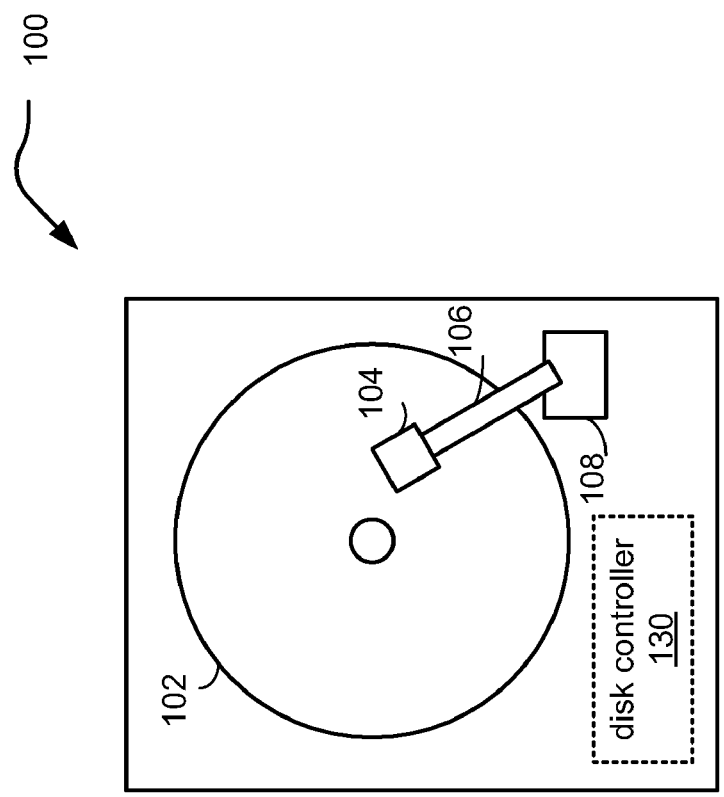
FIG. 2 illustrates an embodiment of a disk drive unit.

FIG. 2 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device.

Figure 3:
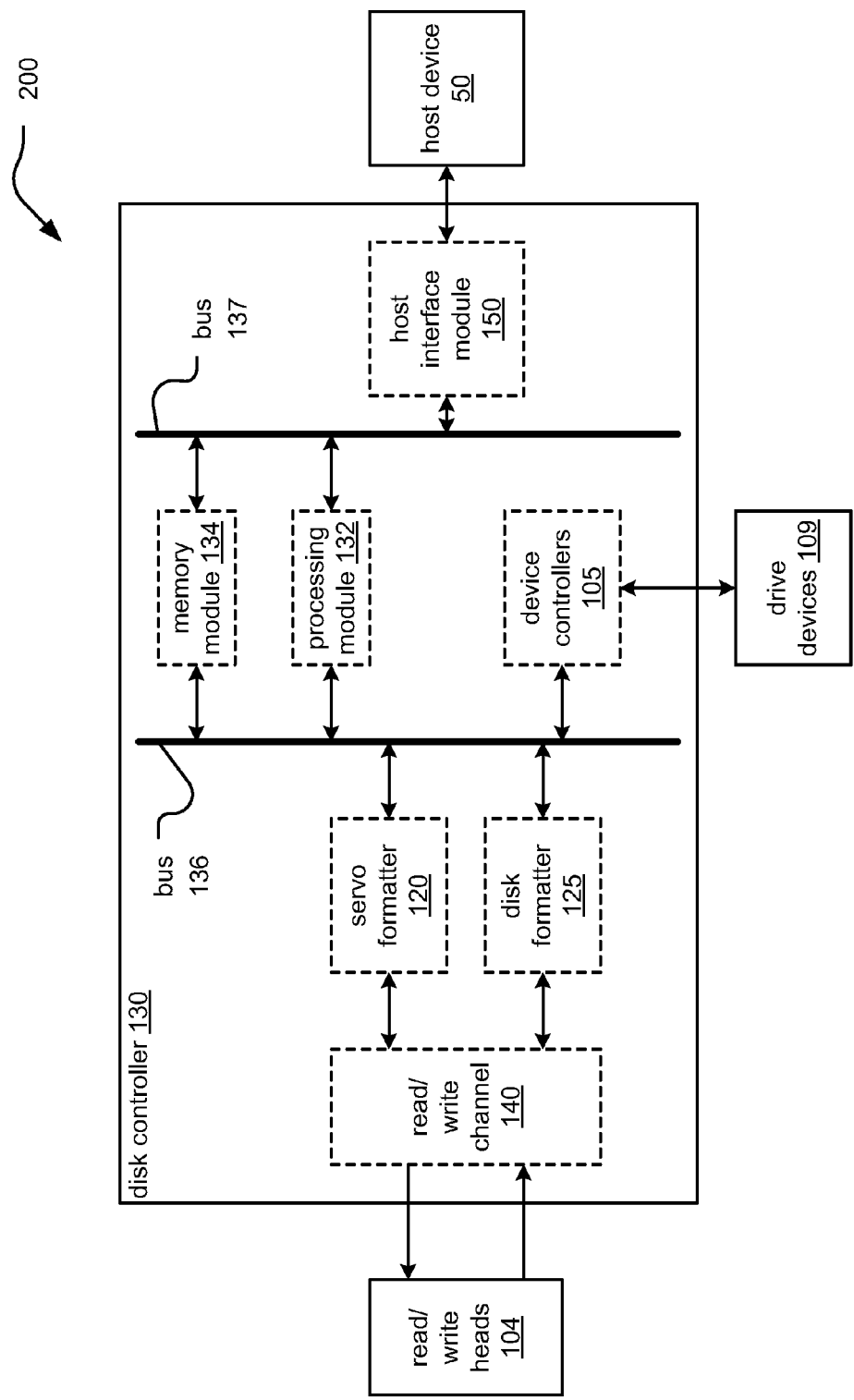
FIG. 3 illustrates an embodiment of an apparatus that includes a disk controller.

FIG. 3 illustrates an embodiment of an apparatus 200 that includes a disk controller 130. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102. Servo formatter 120 provides clock signals and other timing signals based on servo control data read from disk 102. Device controllers 105 control the operation of drive devices 109 such as actuator 108 and the servo motor, etc. Host interface 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, and servo formatter 120 that are interconnected via bus 136 and bus 137. The host interface 150 can be connected to only the bus 137 and communicates with the host device 50. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

When the drive unit 100 is manufactured, disk formatter 125 writes a plurality of servo wedges along with a corresponding plurality of servo address marks at equal radial distance along the disk 102. The servo address marks are used by the timing generator for triggering the "start time" for various events employed when accessing the media of the disk 102 through read/write heads 104.

Figure 4:
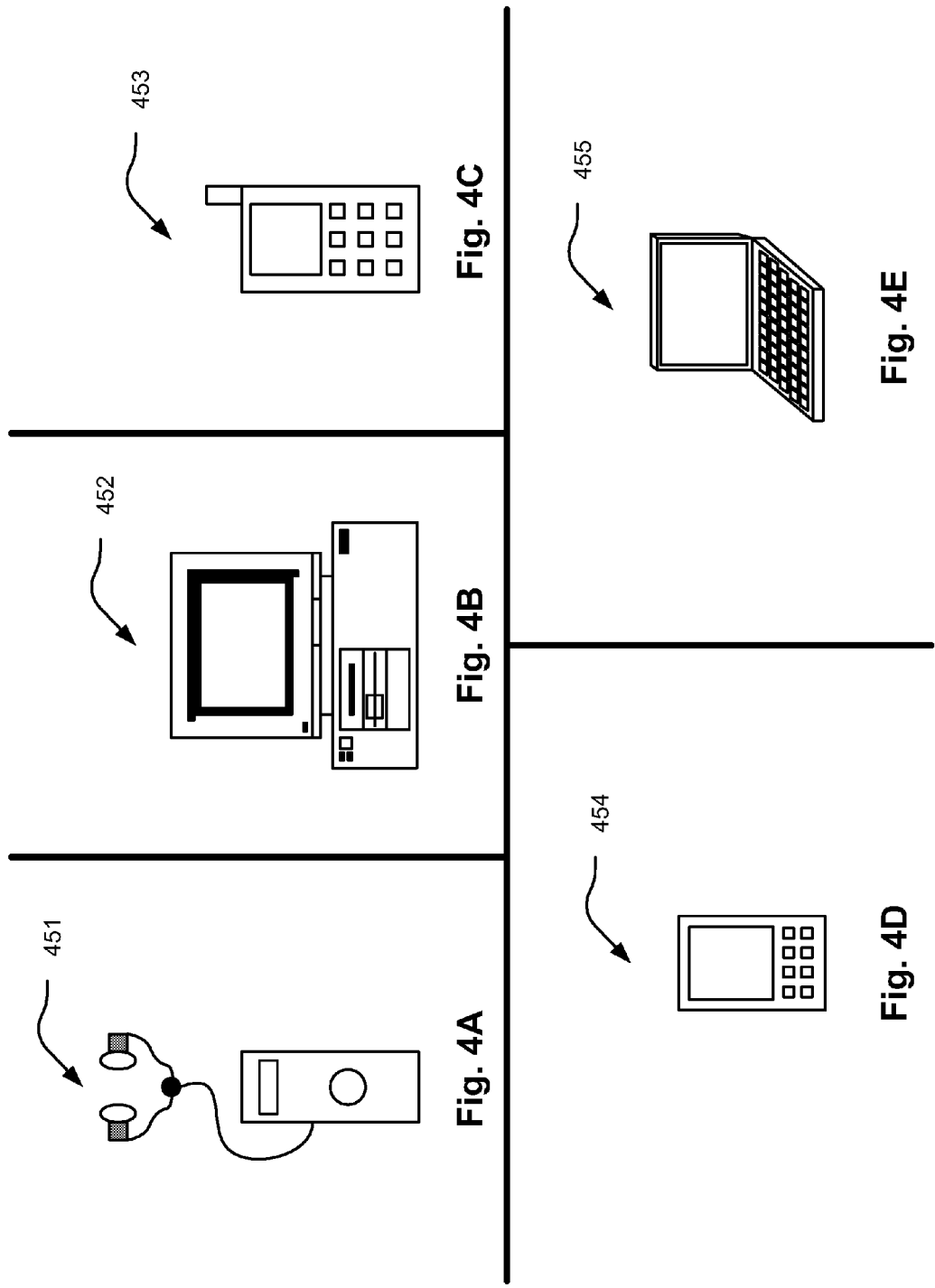
FIG. 4A illustrates an embodiment of a handheld audio unit.
FIG. 4B illustrates an embodiment of a computer.
FIG. 4C illustrates an embodiment of a wireless communication device.
FIG. 4D illustrates an embodiment of a personal digital assistant (PDA).
FIG. 4E illustrates an embodiment of a laptop computer.

FIG. 4A illustrates an embodiment of a handheld audio unit 451. In particular, disk drive unit 100 can be implemented in the handheld audio unit 451. In one possible embodiment, the disk drive unit 100 can include a small form factor magnetic hard disk whose disk 102 has a diameter 1.8" or smaller that is incorporated into or otherwise used by handheld audio unit 451 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 4B illustrates an embodiment of a computer 452. In particular, disk drive unit 100 can be implemented in the computer 452. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 452 to provide general purpose storage for any type of information in digital format. Computer 452 can be a desktop computer, or an enterprise storage devices such a server, of a host computer that is attached to a storage array such as a redundant array of independent disks (RAID) array, storage router, edge router, storage switch and/or storage director.

FIG. 4C illustrates an embodiment of a wireless communication device 453. In particular, disk drive unit 100 can be implemented in the wireless communication device 453. In one possible embodiment, disk drive unit 100 can include a small form factor magnetic hard disk whose disk 102 has a diameter 1.8" or smaller that is incorporated into or otherwise used by wireless communication device 453 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 453, emails, webpage information and other information downloaded from the Internet, address book information, and/or any other type of information that may be stored in a digital format.

In a possible embodiment, wireless communication device 453 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 453 is capable of communicating via the Internet to access email, download content, access websites, and provide steaming audio and/or video programming. In this fashion, wireless communication device 453 can place and receive telephone calls, text messages such as emails, short message service (SMS) messages, pages and other data messages that can include attachments such as documents, audio files, video files, images and other graphics.

FIG. 4D illustrates an embodiment of a personal digital assistant (PDA) 454. In particular, disk drive unit 100 can be implemented in the personal digital assistant (PDA) 454. In one possible embodiment, disk drive unit 100 can include a small form factor magnetic hard disk whose disk 102 has a diameter 1.8" or smaller that is incorporated into or otherwise used by personal digital assistant 454 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 4E illustrates an embodiment of a laptop computer 455. In particular, disk drive unit 100 can be implemented in the laptop computer 455. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 452 to provide general purpose storage for any type of information in digital format.

When implementing ECCs within devices that include HDDs, many different types of processes may be performed during the encoding and decoding processing. Various types of ECCs can be employed including turbo coding, turbo trellis coded modulation (TTCM), parallel concatenated turbo code modulation (PC-TCM), Reed-Solomon (RS) coding, LDPC (Low Density Parity Check) coding, and/or other types of ECC. Additionally, Run length limiting (RLL) and Running digital sum (RDS) and may also be applied to control DC content of stored signals.

An RDS/RLL data encoder/decoder (ENDEC) modifies the user data to improve the properties of the data when processed using longitudinal recording channels. This allows the data, as read, to satisfy a pre-defined run-length constraint. For perpendicular recording channels, the RDS/RLL ENDEC will not have an excessive amount of DC content.

Figure 5:
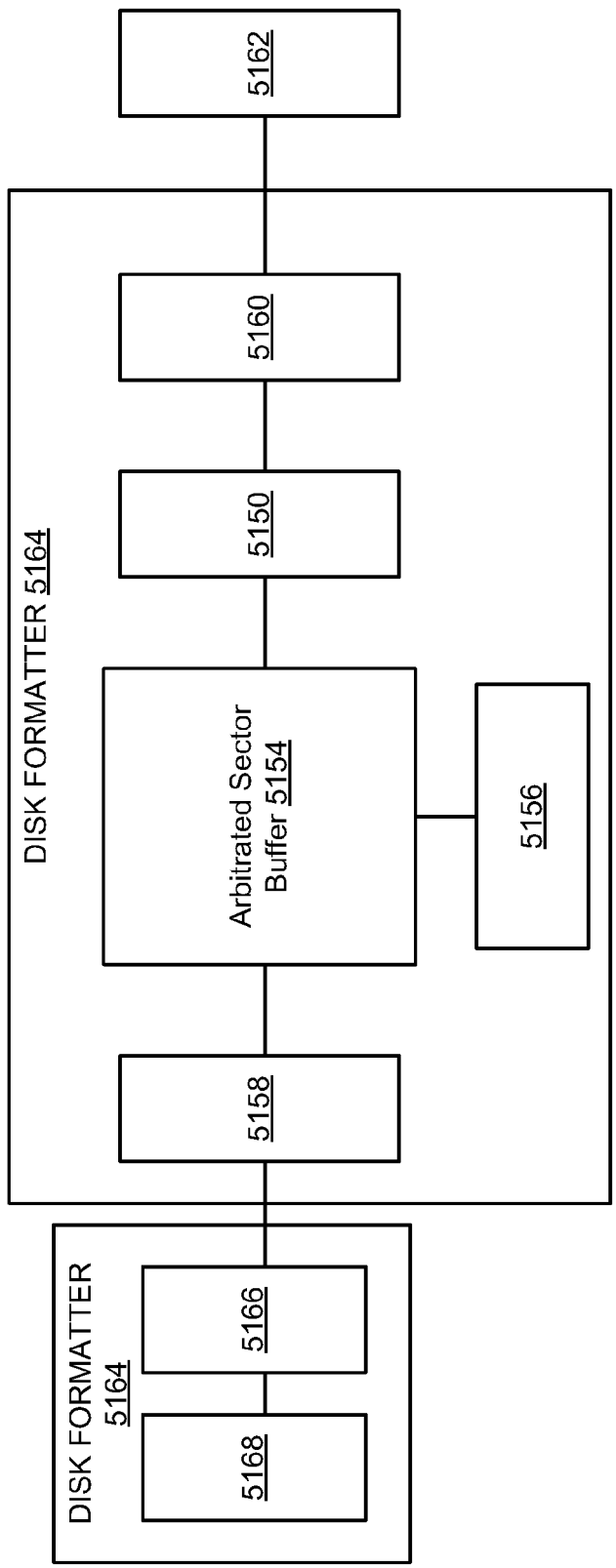
FIG. 5 depicts an RDL/RLL ENDEC used within embodiments of the present invention.

FIG. 5 depicts an RDL/RLL used within embodiments of the present invention. This embodiment segregates data bits and redundant bits in order to facilitate the storage and retrieval of user data. This allows data symbols that fit within familiar boundaries to be generated only from either data bits or redundant information bits. User data may be used to directly generate data symbols from user data. Redundant information bits may be accumulated until enough bits are present to generate a redundant information data symbol. ECC may be applied to the user data and redundant information separately.

Integrating both error correction capabilities and systematic coding within the disk controller, allows the potential to propagate errors of encoded data to be significantly reduced. Unlike prior schemes which encoded modulation code control bits with the user data, embodiments of the present invention separate the encoded user data and the redundant information (redundant control bits). In this way the redundant bits can be recovered and may involve the application of an error control scheme to ensure that the proper redundant control bits are recovered. This processing scheme helps to ensure that data is not lost when improper modulation coding bits are not recovered or result in the propagation of errors throughout the encoded user data.

FIG. 5 provides a functional block diagram of the connections between RDL/RLL ENDEC 5150 and surrounding functional blocks in accordance with embodiments of the present invention. The first series of functional blocks 5152 is collectively known as the disk data path. These functional blocks include an arbitrated sector buffer (ASB) 5154, on the fly error correction (OTFEC) module 5156, FIFO buffer 5158, 48/32 translator 5160 and the previously mentioned RLL/RDS ENDEC 5150. Disk data path 5152 can be communicatively coupled to buffer manager 5162 as well as disk formatter 5164. Disk formatter may include a bit staging module 5166 and a channel interface 5168.

Traditionally ENDEC 5150 has been located in the channel, this stems from prior configurations where the read channels were not integrated with the HDD control logic. These configurations may be a SoC or multi chip solution. RDS/RLL ENDEC 5150 has previously been considered to be part of the channel technology, which was not integrated into the disk controller. However, one can now integrate the read channel and the disk drive controller into a SoC solution. Such integration now allows one to reverse the order of the ECC and ENDEC.

Redundant information can be broken apart from the user data. The segregated redundant information and user data may then be used to generate data symbols. These data symbols comprise user data symbols and redundant information symbols. These data symbols may then be modulated using a systematic code such as an RLL and RDS data translation to reduce the DC content of the encoded data symbols.

When redundant information is segregated from the user data and transferred separately, no translation is required in order to repack the data within familiar boundaries. The redundant information may be accumulated until enough information is present to fit within a predefined boundary. In a prior system where the RDS/RLL encoding/decoding is performed in parallel at higher frequencies, translation of large amounts of user data that exceeds familiar boundaries back to the data path width adds a substantial amount of SOC complexity and timing difficulty to ENDEC 5150. First, such solutions require a more complicated elastic pipeline in order to generate and remove the extra words through the data path. Second, a fairly cumbersome circuit may be required to perform the translation. The wider the code word, the more cumbersome the translation and the more difficult it will be to meet the timing requirements.

A second advantage of systematic codes is the simplification that systematic codes provide in determining the locations of the redundant information. This allows an ECC scheme to correct the redundant information and encoded user data separately. This helps ensure that the decoding process is correctly performed. For example, this may be particularly useful within diagnostics applications where a user wants to determine bit-error rates (BER) of user data on the media. Another advantage relates to performing S/W ECC correction in the main buffer. If the redundant information is not segregated from the user data, the redundant information will be much more difficult to re-encode with the uncorrected redundant information, correct the encoded data and decode the data with the corrected redundant information. Segregating the redundant information greatly simplifies this process.

Since the ENDEC processes are tightly integrated with read channel processes an RLL/RDS ENDEC interface specification may be used to define an interface that provides a means for segregating the redundant information and defines a signaling and feedback mechanism to properly connect into the controller's data path.

When the RDS mode is enabled, the RDS encoder stores a predetermined number of bits (the length of an RDS code word) of user data in a pipelined register bank internal to ENDEC 5150 prior to encoding. For example, the length of the code word was chosen in one embodiment to be evenly devisable by the 48-bit data path width. Based on the properties of the data, one of four possible encoding selections will be chosen such that the RDS is nearest to zero. This choice allows the DC content to be minimized. The choice of the encoding selection related to the new code word is stored as two bits of redundant information and is accumulated in a side register.

During the transfer of user data from the main buffer into ASB 5152, a one-for-one shift of quad symbols is performed through RDS encoder 5150 once its pipeline is filled. Meanwhile, each time 12-bits (a symbol) of redundant information is accumulated, a request is made to ASB to store a new redundant symbol at the next (segregated) redundant information location within ASB. The storage location for this redundant information within the ASB is defined by a pointer within ASB which is pre-loaded at the beginning of a host-side ASB transfer with a starting location defined by a previously stored value.

Since the starting location of the redundant information within the disk sector can be non-aligned on a quad-symbol boundary, the final (partial) quad symbol of RDS encoded user data must be properly combined with the initial redundant information symbol(s) such that they are preserved as initially written. This is solved within the ASB logic and is not required to be addressed by the RDS encoder.

A second RDS encoder (RDS2) and an RDS checking circuit may be provided in the Disk Formatter to ensure that the ECC parity bits and the segregated redundant information do not violate RDS constraints.

Figure 6:
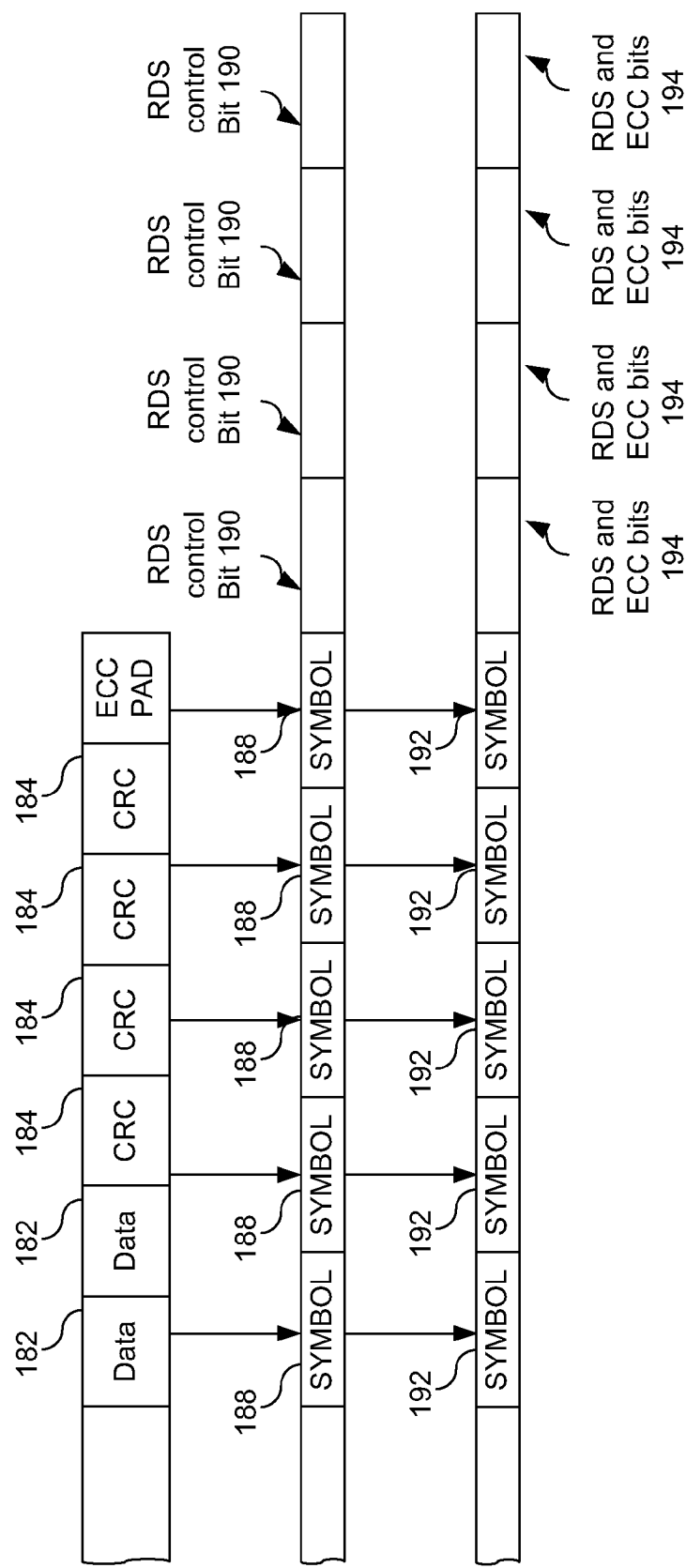
FIG. 6 depicts the integration of RDS 1 and RDS 2 redundant information into disk data stream in accordance with embodiments of the present invention.

FIG. 6 depicts the integration of RDS1 and RDS 2 redundant information into disk data stream 180. As shown here, data bits 182 and redundant information bits such as CRC bits 184 are segregated and followed by ECC information 186. During a disk write operation having the RDS mode enabled, the stream (including both data and error correction information) is processed to reduce the DC content. This in turn facilitates the longitudinal storage and retrieval of the information from the magnetic media. This results in data symbols 188 that fit within familiar boundaries to be generated only from either data bits or redundant information bits. User data may be used to directly generate data symbols from user data. Redundant information bits may be accumulated until enough bits are present to generate a redundant information data symbol. ECC may be applied to the user data and redundant information separately. These data symbols may be modulated using a systematic code that specifies how the user data and error correction bits have been scrambled (modulated) in order to minimize DC content and facilitate storage to and retrieval from magnetic media. RDS control bits 190 describe this process. Prior to being written to disk, this information may be further analyzed to determine whether or not a further need exists to reduce the DC content of the RDS control bits by performing a second RDS encoding. In such a case the RDS and ECC bits 194 may be stored separately from symbols 192. This allows the RDS or modulation control bits 194 to be retrieved and processed separately so that errors associated with the decoding and encoding of these bits do not propagate through the reading and writing of data to and from the magnetic media.

Figure 7:
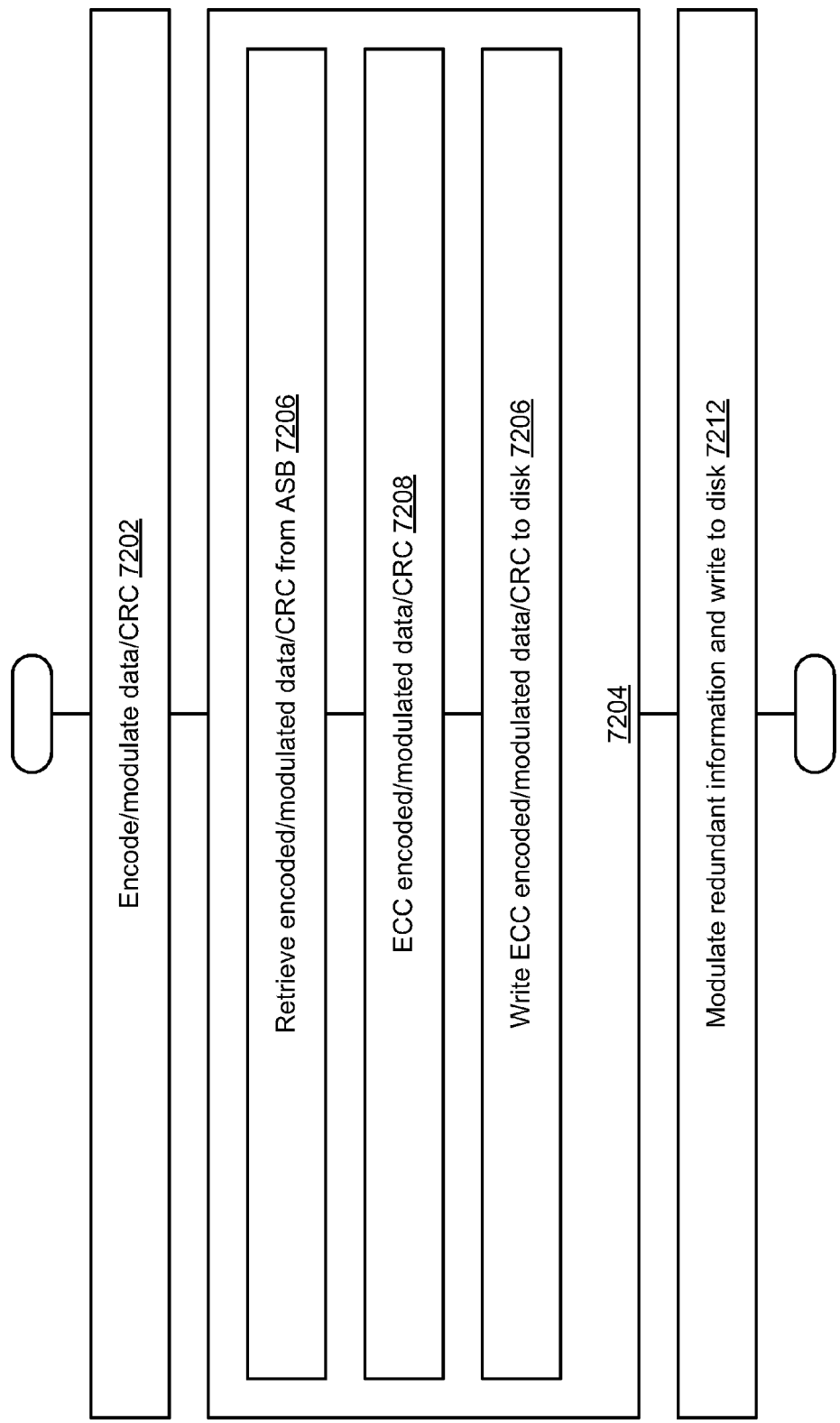
FIG. 7 provides a logic flow diagram describing a disk write operation in accordance with embodiments of the present invention.

During a disk write operation, as illustrated by the logic flow diagram of FIG. 7, the data and redundant information is segregated and stored in the ASB in step 7202. The segregated data and user information is used to generate data symbols in step 7204. When a systematic code is applied to reduce DC content, such as an RDS or RLL code, the data symbols may be modulated using the systematic code (RDS1) in step 7206. An ECC process may be applied to the data symbols generated previously in step 7204 to generate ECC parity symbols. A second systematic code (RDS2) may be applied to reduce DC content of the ECC parity symbols in step 7208. The modulated data symbols and ECC parity symbols may be written to the disk in step 7210.

Figure 8:
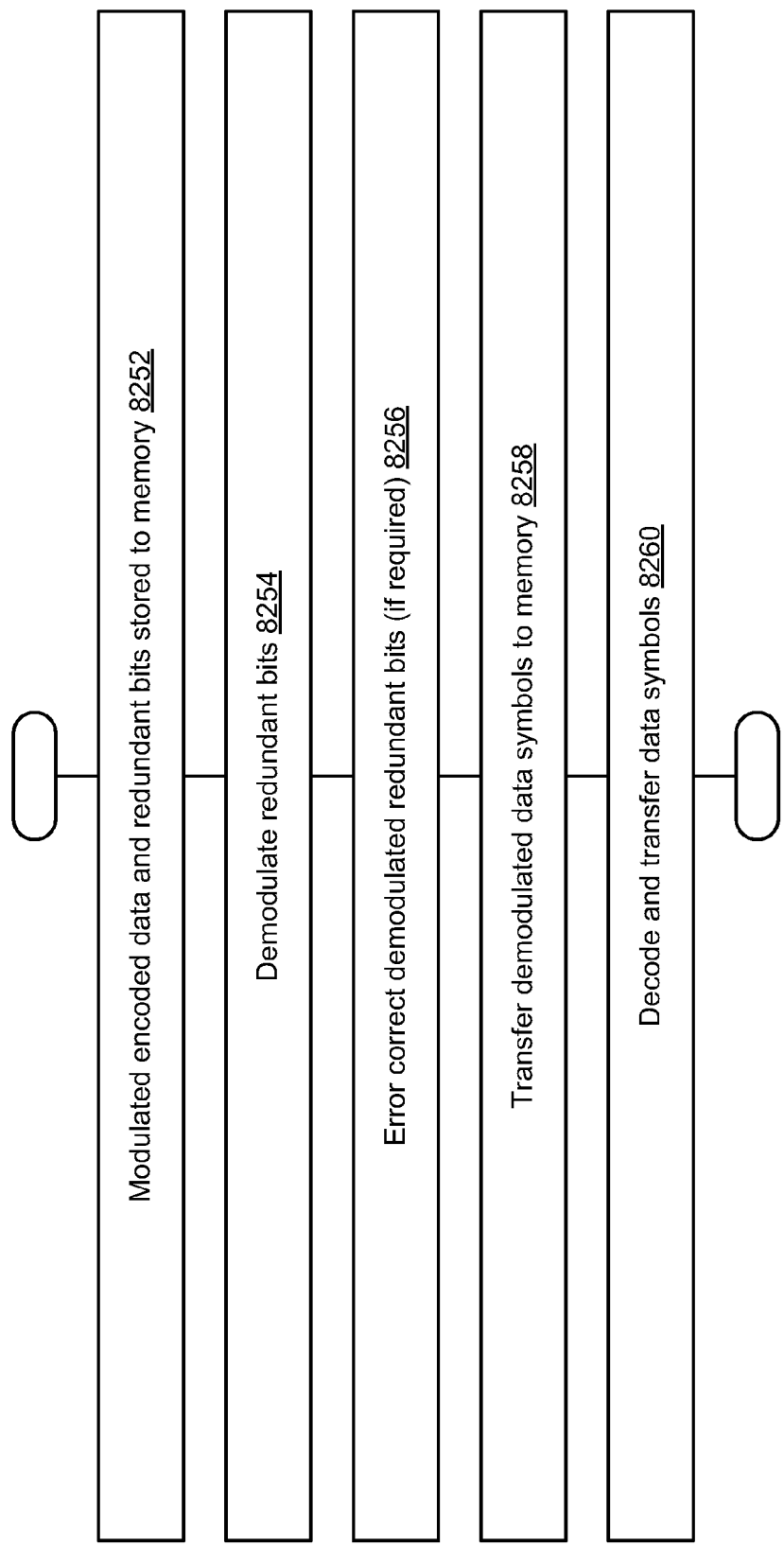
FIG. 8 provides a logic flow diagram describing a disk read operation in accordance with embodiments of the present invention.

During a disk read operation, as illustrated by the logic flow diagram of FIG. 8, when RDS mode is enabled, the RDS1 encoded data symbols based on user data bits and redundant information bits, and RDS2 encoded ECC parity symbols are read from the storage media and stored in the appropriate ASB location (e.g., memory) in step 8252. In step 8254 the RDS1 encoded data symbols and RDS2 encoded ECC parity symbols are demodulated. ECC syndromes are computed based on the data symbols in step 8256. The ECC syndromes and demodulated ECC parity symbols may be compared to determine the need for error correction. This error correction may then be performed as required. The demodulated (decoded) ECC symbols are clocked into the ECC symbol generator but not into the ASB. If an ECC correction is required in Step 8256, the symbols are transferred to on the fly error correction (OTFEC) module and the correction is performed. At this time, the user data bits and redundant information bits are recovered from the data symbols and released to be transferred to the main buffer in step 8258.

When the unity rate RLL Mode (provided for longitudinal recording) is enabled, the randomizer seed is first, loaded into the unity rate randomizer prior to the transfer of Buffer Manager data into the ABS. Then, during the transfer the randomizer generates a 48-bit random pattern based on four 12-bit Galois Field constant multiplications to generate the next four 12-bit pseudo random values, simultaneously. This 48-bit random value is XOR'd with the data/CRC as it is passed through the RDS/RLL ENDEC on its way to the ASB.

Like the RDS redundant storage, the RLL randomizer seed is stored, in the ASB. The Disk Formatter section 164 of FIG. 5 contains an RLL checking circuit to cheek for RLL constraint violations during disk write operations.

Figure 9:
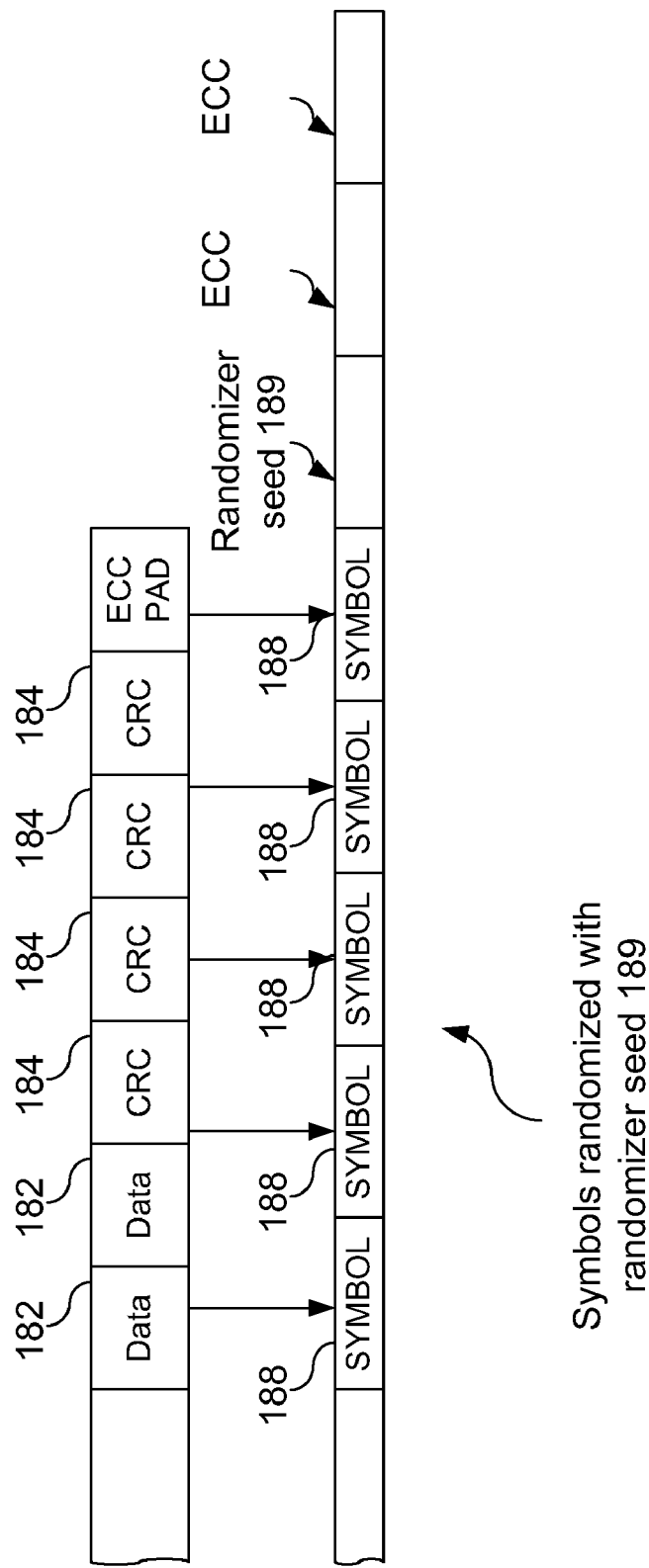
FIG. 9 depicts the integration of the RLL randomizer seed into the disk data stream in accordance with embodiments of the present invention.
Figure 10:
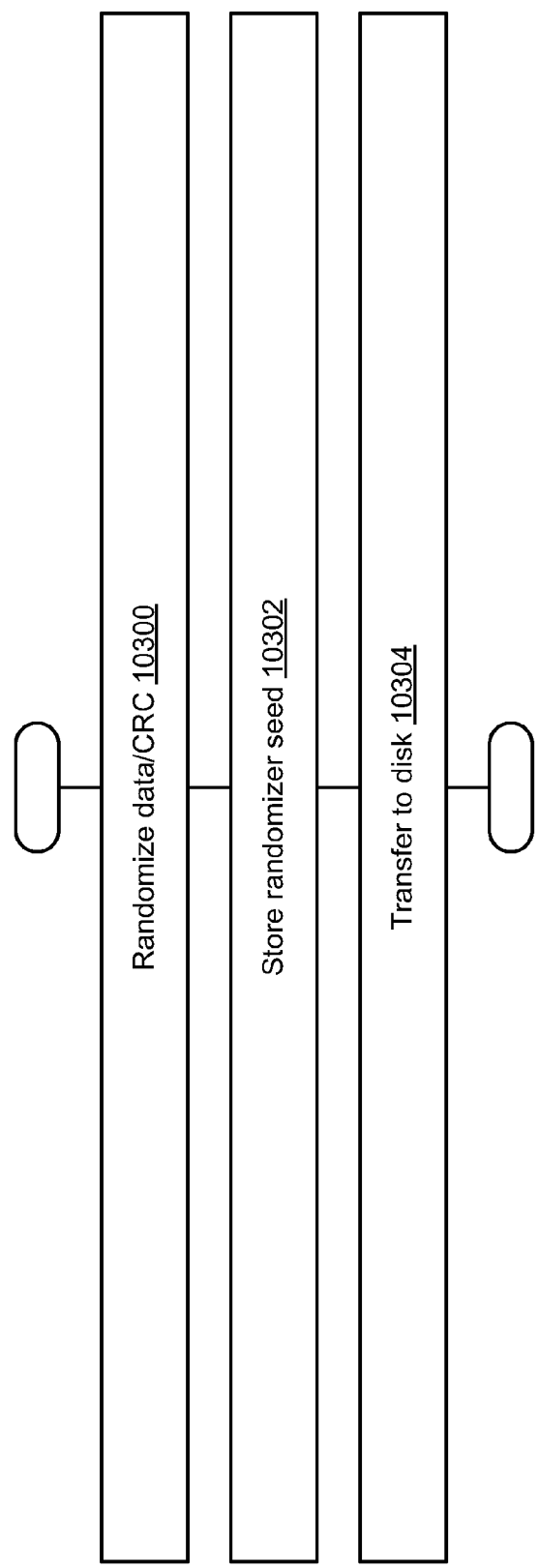
FIG. 10 provides a logic flow diagram describing a disk write operation in accordance with embodiments of the present invention.

FIG. 9 depicts the integration of the RLL randomizer seed into the disk data stream. During a disk write operation such as the one presented in the logic flow diagram of FIG. 10, when RLL mode is enabled, the data/CRC is randomized in step 10300. This randomization may be done 48-bits at a time as it is being stored in the ASB. The randomizer seed is stored in step 10302, following the data as described above. Then during the transfer to disk of step 10304, the encoded user data and the randomizer seed are retrieved from the ASB, ECC encoded and written to the disk. As seen previously in FIG. 6, the data initially includes user data 182, redundant (CRC) information 184 and ECC information. This information may be processed to produce data symbols 188 and ECC parity symbols. Symbols 188 may be randomized using randomizer seed 189. When the RLL mode is enabled the randomizer seed 184 may be stored following the data symbols. As shown in FIG. 9 and with reference to the logic flow diagram of FIG. 10, modulation control bits may be segregated in order to prevent error propagation within data that is written to and read from magnetic media.

Figure 11:
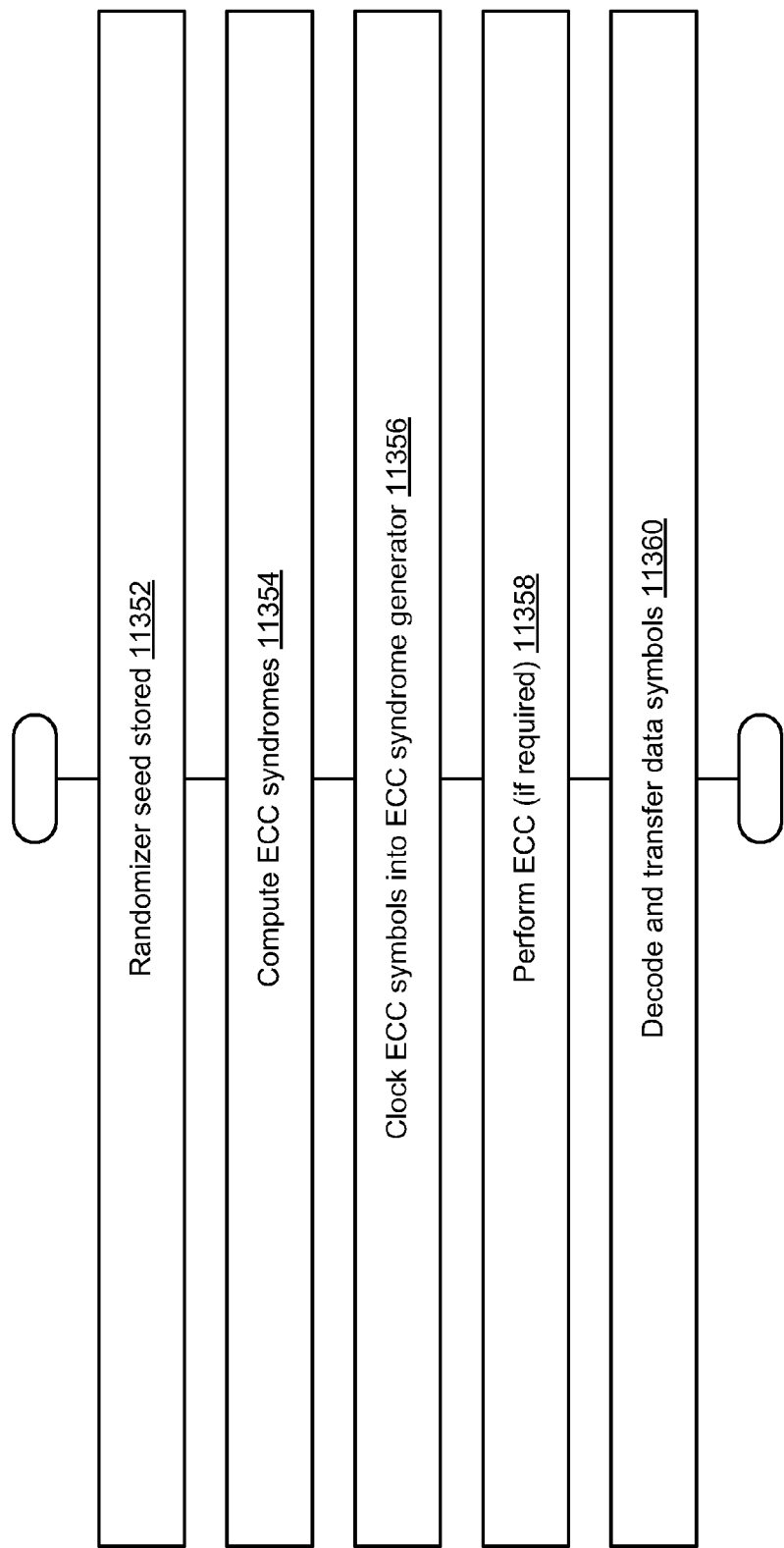
FIG. 11 provides a logic flow diagram describing a disk read operation in accordance with embodiments of the present invention.

During a disk read operation such as that illustrated by the logic flow diagram of FIG. 11 when RLL mode is enabled, the randomized data/CRC (modulated data symbols) and randomizer seed are stored in the appropriate ASB location in step 11352. The ECC syndromes are simultaneously computed in step 11354. Immediately following the randomizer seed are the ECC parity symbols which are then clocked into the ECC syndrome generator in step 11356 but not into the ASB. If an ECC correction is required (e.g., as shown in block 11358), then symbols ae decoded and the data symbols are transferred the syndromes are transferred to the OTFEC in step 11360 and the correction is performed. At this time, the corrected disk sector is released for transfer to the main buffer in step. At the start of the transfer to the buffer, the unity rate randomizer is initialized with the randomizer seed, pointed to by the same pointer mechanism as described for the disk write operation. Then the data is de-randomized by XORing the randomizer data pattern with the (already randomized) user data and transferred to the buffer manager.

Embodiments in the present invention provide a system and method of storing redundant information separately and contiguously with encoded user data such that all redundant information is co-located. Additionally, boundaries may be defined for how error correction coding is processed such that redundant information may be error corrected independently from encoded user data. By providing this ability, many controller related issues are addressed and the propagation of errors and the effects thereof may be reduced. More specifically, one embodiment provides a method to encode (modulate) data to be written to magnetic media. First, a bit stream that comprises data bits and redundant bits is received. This bit stream may be encoded to produce a plurality of symbols. This encoding may involve modulation such that the DC content of the plurality of symbols is limited. A first encoding process (modulating process) may be used to limit the DC content of the symbols. This modulation may also result in a first set of informational bits that describe the modulation process used to limit the DC content of the symbols. This first set of informational bits may also be modulated to limit the DC content of this set of informational bits. This results in a second set of informational bits that may be segregated from the plurality of the symbols. Additionally error correction of the information bits that describe the modulation process used to limit the DC content of the symbols and the first set of informational bits may be performed separately from that error correction performed on the user data and redundant information. This allows the informational bits that describe the modulation processes used to limit DC content to be corrected independently from the encoded user data.

Embodiments of the present invention also address the process wherein data may be decoded from magnetic media. This involves reading a first set of information bits contiguous to but segregated from a set of symbols. This set of informational bits may describe a modulation process used to limit the DC content of the set of symbols. Additionally error code correction may be performed on the set of informational bits separately from that performed on the set of user data bits symbols. This allows a processor to determine the demodulation process to be applied to the symbols which have been modulated in such a manner as to limit the DC content there in. By performing error correction coding on the set of informational bits separately from that performed on the symbols one can avoid or limit the propagation of errors which may result in an inaccurate description of the modulation process to be applied to the symbols. Symbols may then be demodulated using the set of informational bits to produce data bits and redundant bits which may have error correction coding algorithms applied to result in the proper decoding of the data bits.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Figure 12:
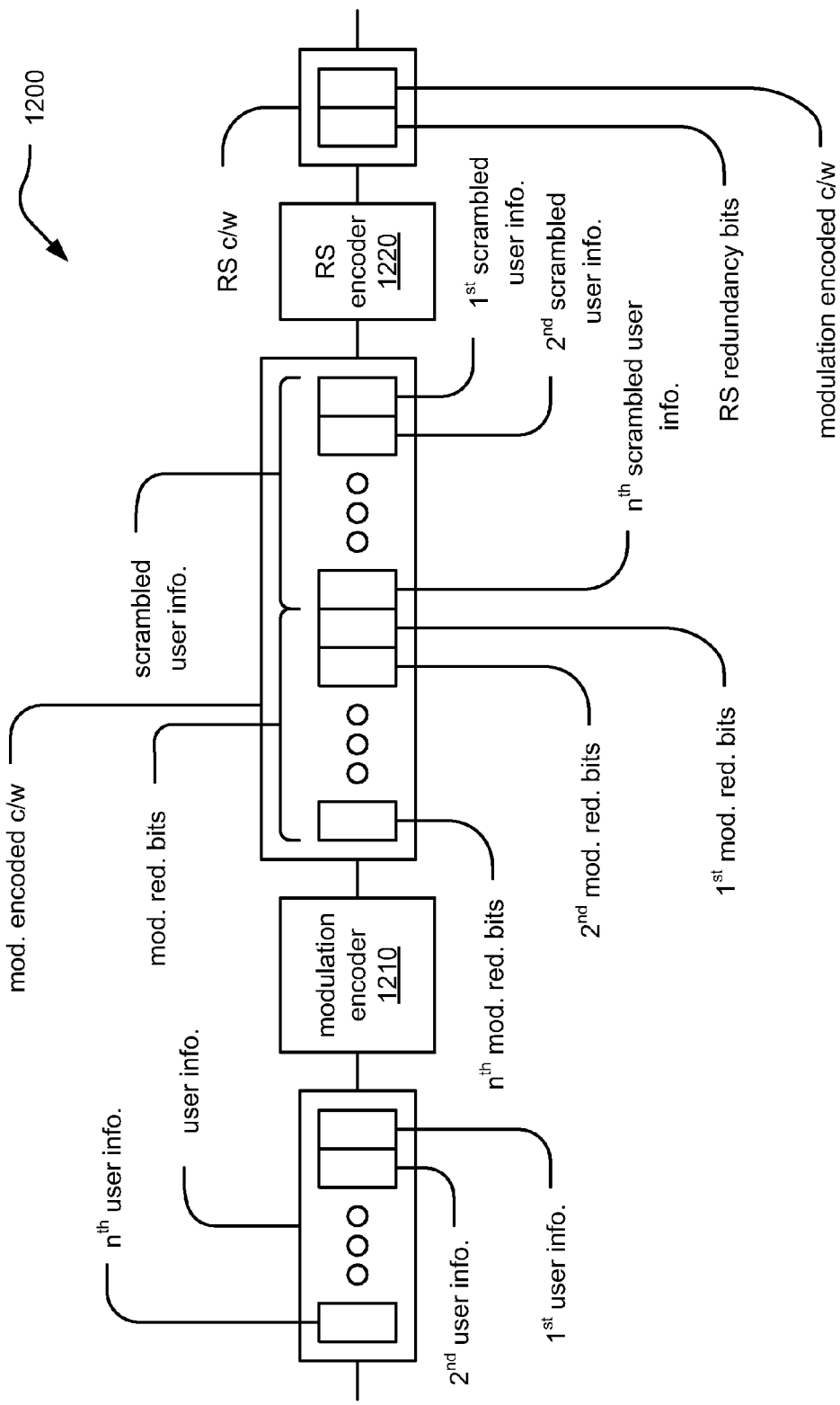
FIG. 12 illustrates an embodiment of an encoder that is operable to perform combined modulation encoding and RS (Reed-Solomon) encoding.

FIG. 12 illustrates an embodiment of an encoder 1200 that is operable to perform combined modulation encoding and RS (Reed-Solomon) encoding. User information (e.g., which may alternatively and generally be referred to as 'data', or 'information' or any other type of digital information). The user information includes a plurality of sub-portions (e.g., packets, frames, and/or any other sub-division into which the user information is partitioned). This user information may come from an arbitrated sector buffer (ASB) within a hard disk drive (HDD). A modulation encoder 1210 processes the user information to generate scrambled information and modulation redundancy bits. The modulation encoder 1210 can be viewed as providing a degree of randomness and/or distribution of 1s and 0s within the user information such that an inordinate number of 1s and/or 0s are not in succession with one another. In some digital media storage devices, when a signal that includes a relatively large number of successive 1s and 0s, the signal can sometimes include an undesirable amount of DC component in the signal. It is generally desirable to ensure that the 1s and 0s of the signal have a more even distribution within the signal before writing it to the media. This can ensure a minimization of any error propagation in any error correction code (ECC) encoding and/or decoding that is performed on information written to and/or read from the media of a memory storage device. From certain perspectives, a modulation code such as one employed by the modulation encoder 1210 can be viewed as being a mapping that ensures the modulation encoded codeword output there from has good run length limited (RLL) properties; this can be particularly desirable for HDDs having magnetic storage media that is written to/read from via longitudinal means. In HDDs having magnetic storage media that is written to/read from via perpendicular means, a low baseline error (which is actually a more stringent parameter to meet than having a good RLL property) is more appropriate.

Generally speaking, the modulation encoder 1210 outputs scrambled user information and modulation redundancy bits. For example, one embodiment can employ a modulation encoder 1210 that encodes a user information portion having X number of bits, and the modulation encoder 1210 then outputs scrambled user information that also includes X number of bits (e.g., the user information portion having X number of bits that have undergone modulation encoding) as well as Y number of bits of modulation redundancy bits. As one particular example, X=192, and Y=2; in such an embodiment, the modulation encoder 1210 receives a user information portion having 192 bits and then outputs 194 bits (e.g., 192 of which are modulation redundancy bits and 2 of which are modulation redundancy bits).

The modulation encoder 1210 also performs segregation of the scrambled user information and the modulation redundancy bits generated there from. In some embodiments, the modulation encoder 1210 itself can also include a segregation module (e.g., which can be an embedded module within the modulation encoder 1210 and can be coupled to a memory also embedded within the modulation encoder 1210 in some embodiments) for performing this segregation processing of ensuring that the scrambled user information is segregation from the modulation redundancy bits.

For example, in one embodiment, the modulation encoder 1210 is operable to encode first user information of the plurality of user information thereby generating first scrambled user information and first modulation redundancy bits. The modulation encoder 1210 also is operable to encode second user information of the plurality of user information thereby generating second scrambled user information and second modulation redundancy bits. Then, the modulation encoder 1210 is operable to output a modulation encoded codeword that includes the first scrambled user information, followed by the second scrambled user information, followed by the first modulation redundancy bits, followed by the second modulation redundancy bits. Clearly, a larger number of scrambled user information and modulation redundancy bits may also be generated by the modulation encoder 1210. In such embodiments, the scrambled user information (corresponding to each of the portions of user information that have undergone modulation encoding) is segregated from each of the corresponding redundancy bits.

The scrambled user information and the modulation redundancy bits (in their segregated arrangement which form a modulation encoded codeword) are then provided to a RS (Reed-Solomon) encoder 1220 where they under RS encoding to generate a RS codeword that includes RS redundancy bits. The RS encoder 1220 can be a systematic encoder in some embodiments, such that the modulation encoded codeword is followed by the RS redundancy bits. For example, the first scrambled user information and the second scrambled user information form scrambled user information, and the first modulation redundancy bits and the second modulation redundancy bits form modulation redundancy bits. The overall encoder 1200 includes both the modulation encoder 1210 and the RS encoder 1220. The encoder 1200 outputs a RS codeword that includes the scrambled user information, the modulation redundancy bits, and the RS redundancy bits such that the scrambled user information, the modulation redundancy bits, and the RS redundancy bits are segregated from each other. For example, the RS codeword includes the modulation encoded codeword followed by the RS redundancy bits that are generated by and correspond to the modulation encoded codeword. The RS codeword can be provided to a memory (e.g., a storage media of a HDD, back to a HDD's ASB, etc.) or to a communication channel and/or a decoder. For example, the RS codeword can be stored within an ASB in 12 bit symbols in one embodiment. In such an instance, the redundancy bits are segregated when written to the ASB.

Because of the segregated nature of the RS codeword, within an embodiment in which the RS codeword is provided to a memory, each of the components of the RS codeword can be provided to different portions or regions of the memory.

For example, the first scrambled user information and the second scrambled user information are successively written to a first region of a memory. The first modulation redundancy bits and the second modulation redundancy bits are successively written to a second region of the memory. The RS redundancy bits are written to a third region of the memory. Such an embodiment can be viewed that the first scrambled user information and the second scrambled user information for 'scrambled user information', and the 'scrambled user information' is written to the first region of the memory. Also, such an embodiment can be viewed that the first modulation redundancy bits and the second modulation redundancy bits for 'modulation redundancy bits, and the 'modulation redundancy bits' is written to the second region of the memory.

Alternatively, each of the components of the 'scrambled user information' and the 'modulation redundancy bits' are treated individually. In such an embodiment, the first scrambled user information is written to a memory in a first location. The second scrambled user information is written to the memory in a second location that is adjacent to the first location. The first modulation redundancy bits are written to the memory in a third location, and the second modulation redundancy bits are written to the memory in a fourth location that is adjacent to the third location. The RS redundancy bits are written to the memory in a fifth location.

In some embodiments, the scrambled user information, the modulation redundancy bits, and the RS redundancy bits are written to storage media of a hard disk drive (HDD). Thereafter, the scrambled user information, the modulation redundancy bits, and the RS redundancy bits are read from the storage media of the HDD. Then, the scrambled user information, the modulation redundancy bits, and the RS redundancy bits form a read RS codeword. If desired, a decoder can be implemented to perform RS decoding of the read RS codeword to make an estimate of at least one information bit of the plurality of user information encoded therein.

In some instances, the decoder performs RS decoding of the read RS codeword to correct an error within at least one of the scrambled user information, the modulation redundancy bits, and the RS redundancy bits.

In even other embodiment, the scrambled user information, the modulation redundancy bits, and the RS redundancy bits are written to storage media of a HDD, and then only one of the scrambled user information, the modulation redundancy bits, and the RS redundancy bits is read from the storage media of the HDD. If desired, a decoder can be implemented to perform RS decoding of the read one of the scrambled user information, the modulation redundancy bits, and the RS redundancy bits to correct an error therein and/or make an estimate of at least one bit encoded therein.

As mentioned above the user information can come from an ASB implemented within a HDD. In such an embodiment, the user information is provided to the encoder from a first location within the ASB, and the encoder 1200 outputs the scrambled user information, the modulation redundancy bits, and the RS redundancy bits to a second location within the arbitrated sector buffer implemented within the HDD.

If desired, these components can be provided from the ASB to the encoder 1200 at different times such that during a first time, the scrambled user information is output from the arbitrated sector buffer and written to a first location of storage media of the HDD. Then, during a second time, the modulation redundancy bits are output from the arbitrated sector buffer and written to a second location of storage media of the HDD. Then, during a third time, the RS redundancy bits are output from the arbitrated sector buffer and written to a third location of storage media of the HDD.

Similarly, the encoder 1200 can be implemented to receive individual components of the scrambled user information, the modulation redundancy bits, and the RS redundancy bits from the ASB of the HDD at different times. For example, during a first time, a first portion of the scrambled user information is output from the arbitrated sector buffer and written to a first location of storage media of the HDD. During a second time, a second portion of the scrambled user information is output from the arbitrated sector buffer and written to a second location of storage media of the HDD. During a third time, a first portion of the modulation redundancy bits are output from the arbitrated sector buffer and written to a third location of storage media of the HDD. During a fourth time, a second portion of the modulation redundancy bits are output from the arbitrated sector buffer and written to a fourth location of storage media of the HDD. During a fifth time, a first portion of the RS redundancy bits are output from the arbitrated sector buffer and written to a fifth location of storage media of the HDD, and during a sixth time, a second portion of the RS redundancy bits are output from the arbitrated sector buffer and written to a sixth location of storage media of the HDD.

In some embodiments, the user information is provided from a host device that is coupled to a HDD, and the encoder provides the scrambled user information, the modulation redundancy bits, and the RS redundancy bits to storage media of the HDD.

Figure 13:
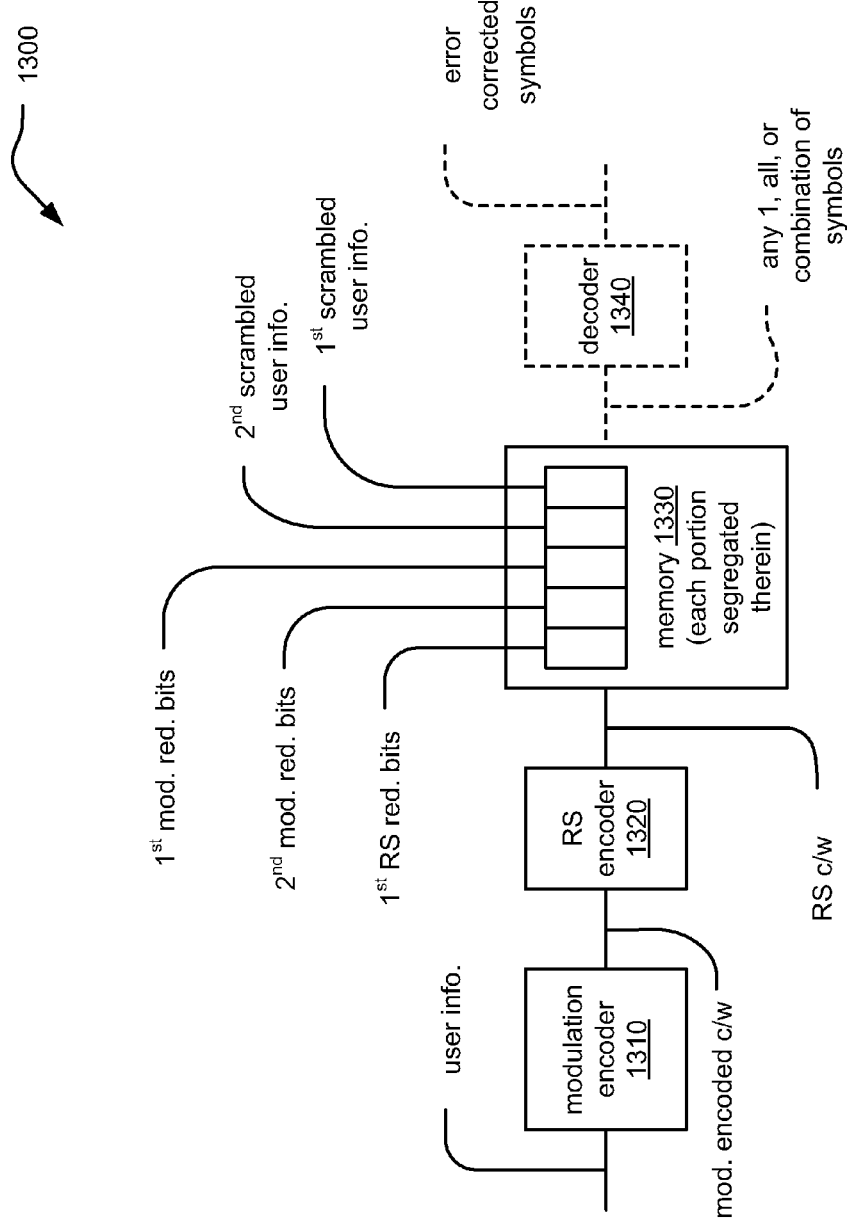
FIGS. 13, 14, and 15 illustrate alternative embodiments of an apparatus including an encoder and/or decoder.
Figure 14:
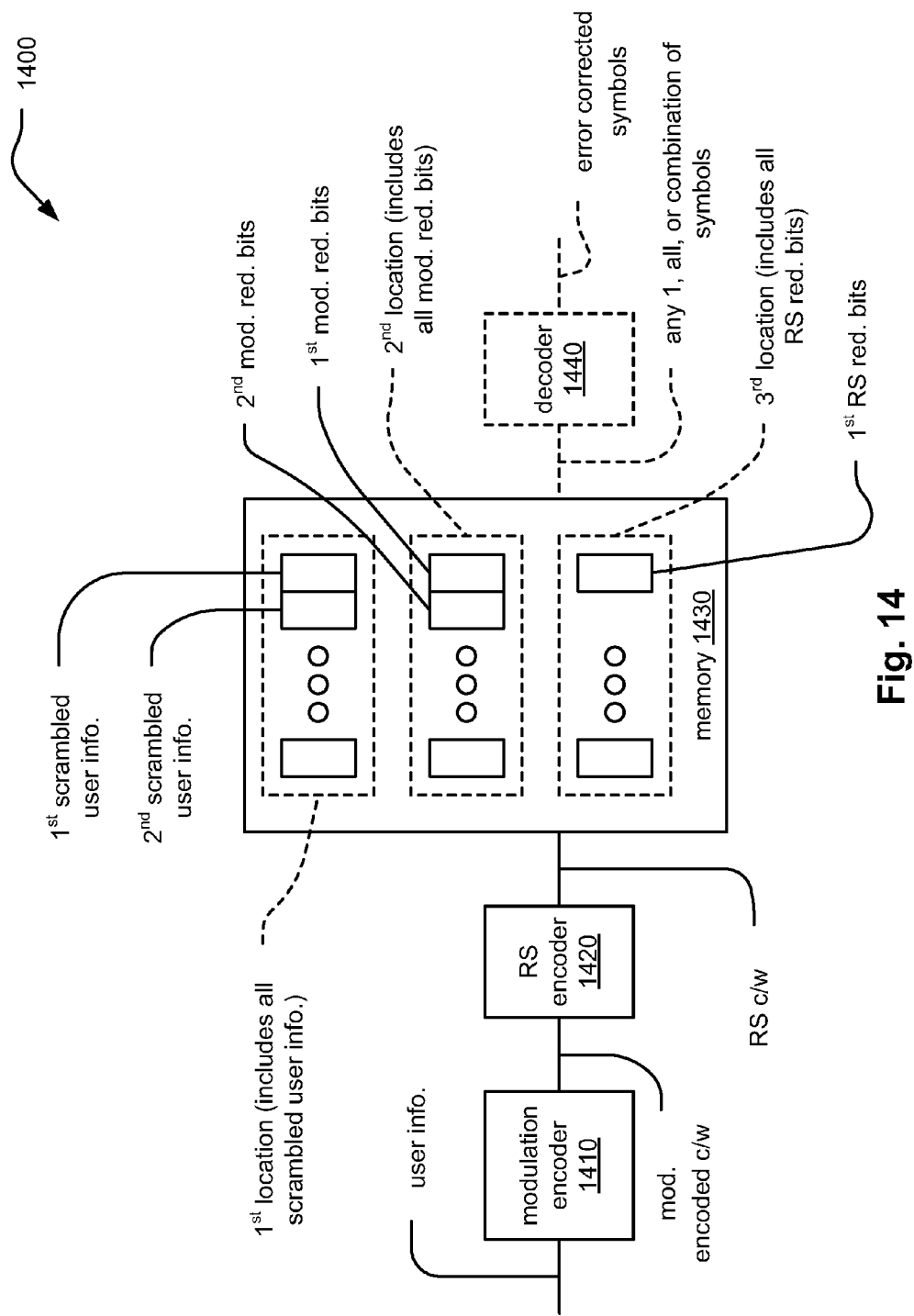
Figure 15:
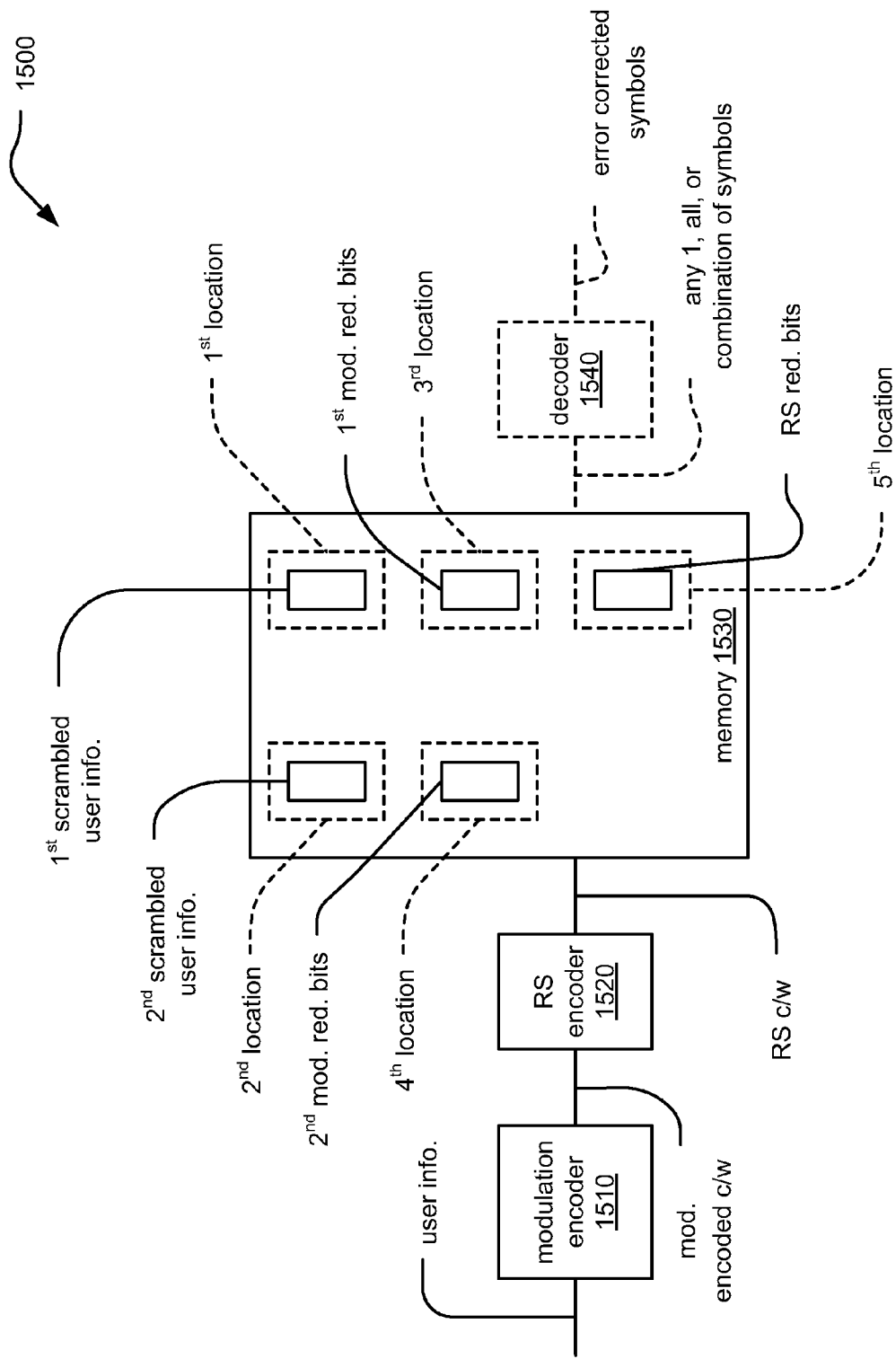

FIGS. 13, 14, and 15 illustrate alternative embodiments of an apparatus including an encoder and/or decoder.

Referring to FIG. 13, user information is provided to a modulation encoder 1310 that processes the user information to generate scrambled information and modulation redundancy bits. The modulation encoder 1310 is operable to encode first user information of the plurality of user information thereby generating first scrambled user information and first modulation redundancy bits. The modulation encoder 1310 also is operable to encode second user information of the plurality of user information thereby generating second scrambled user information and second modulation redundancy bits. Then, the modulation encoder 1310 is operable to output a modulation encoded codeword that includes the first scrambled user information, followed by the second scrambled user information, followed by the first modulation redundancy bits, followed by the second modulation redundancy bits.

The scrambled user information and the modulation redundancy bits (in their segregated arrangement which form a modulation encoded codeword) are then provided to a RS encoder 1320 where they under RS encoding to generate a RS codeword that includes RS redundancy bits. The RS encoder 1320 can be a systematic encoder in some embodiments, such that the modulation encoded codeword is followed by the RS redundancy bits. For example, the first scrambled user information and the second scrambled user information form scrambled user information, and the first modulation redundancy bits and the second modulation redundancy bits form modulation redundancy bits. The overall encoder 1300 includes both the modulation encoder 1310 and the RS encoder 1320. The encoder 1300 outputs a RS codeword that includes the scrambled user information, the modulation redundancy bits, and the RS redundancy bits such that the scrambled user information, the modulation redundancy bits, and the RS redundancy bits are segregated from each other. For example, the RS codeword includes the modulation encoded codeword followed by the RS redundancy bits that are generated by and correspond to the modulation encoded codeword. The RS codeword can be provided to a memory (e.g., a storage media of a HDD, back to a HDD's ASB, etc.) or to a communication channel and/or a decoder.

In this embodiment, the first scrambled user information, the second scrambled user information, the first modulation redundancy bits, the second modulation redundancy bits, and the first RS redundancy bits are provided to a memory 1330 such that each portion thereof is segregated from each other. If desired, any one, all or combination of the RS symbols that form the first modulation redundancy bits, the second modulation redundancy bits, and the first RS redundancy bits can be provided to a decoder 1340 to make an estimate of at least one bit encoded therein or correct an error within at least one bit included therein. The output of the decoder 1340 can include error corrected symbols or estimates of bit encoded within the symbols.

Referring to FIG. 14, user information is provided to a modulation encoder 1410 that processes the user information to generate scrambled information and modulation redundancy bits. The modulation encoder 1410 is operable to encode first user information of the plurality of user information thereby generating first scrambled user information and first modulation redundancy bits. The modulation encoder 1410 also is operable to encode second user information of the plurality of user information thereby generating second scrambled user information and second modulation redundancy bits. Then, the modulation encoder 1410 is operable to output a modulation encoded codeword that includes the first scrambled user information, followed by the second scrambled user information, followed by the first modulation redundancy bits, followed by the second modulation redundancy bits.

The scrambled user information and the modulation redundancy bits (in their segregated arrangement which form a modulation encoded codeword) are then provided to a RS encoder 1420 where they under RS encoding to generate a RS codeword that includes RS redundancy bits. The RS encoder 1420 can be a systematic encoder in some embodiments, such that the modulation encoded codeword is followed by the RS redundancy bits. For example, the first scrambled user information and the second scrambled user information form scrambled user information, and the first modulation redundancy bits and the second modulation redundancy bits form modulation redundancy bits. The overall encoder 1400 includes both the modulation encoder 1410 and the RS encoder 1420. The encoder 1400 outputs a RS codeword that includes the scrambled user information, the modulation redundancy bits, and the RS redundancy bits such that the scrambled user information, the modulation redundancy bits, and the RS redundancy bits are segregated from each other. For example, the RS codeword includes the modulation encoded codeword followed by the RS redundancy bits that are generated by and correspond to the modulation encoded codeword. The RS codeword can be provided to a memory (e.g., a storage media of a HDD, back to a HDD's ASB, etc.) or to a communication channel and/or a decoder.

In this embodiment, the first scrambled user information, the second scrambled user information, the first modulation redundancy bits, the second modulation redundancy bits, and the first RS redundancy bits are provided to a memory 1430 such that each portion thereof is segregated from each other, yet the first scrambled user information and the second scrambled user information form 'scrambled user information', the first modulation redundancy bits and the second modulation redundancy bits form 'modulation redundancy bits', and each RS redundancy bit portion forms 'RS redundancy bits'. The scrambled user information is all provided to a first location within the memory 1430. The modulation redundancy bits are all provided to a second location within the memory 1430. The RS redundancy bits are all provided to a third location within the memory 1430.

If desired, any one, all or combination of the RS symbols that form the first modulation redundancy bits, the second modulation redundancy bits, and the first RS redundancy bits can be provided to a decoder 1440 to make an estimate of at least one bit encoded therein or correct an error within at least one bit included therein. The output of the decoder 1440 can include error corrected symbols or estimates of bit encoded within the symbols.

Referring to FIG. 15, this embodiment is analogous to some of the previous embodiments, in that, it includes a modulation encoder 1510 and a RS encoder 1520. However, in this embodiment, the first scrambled user information, the second scrambled user information, the first modulation redundancy bits, the second modulation redundancy bits, and the first RS redundancy bits are provided to a memory 1530 such that each portion thereof is segregated from each other and also provided to a separate and distinct portion of the memory 1530. For example, the first scrambled user information is provided to a first location of the memory 1530. The second scrambled user information is provided to a second location of the memory 1530. The first modulation redundancy bits are provided to a third location of the memory 1530. The second modulation redundancy bits are provided to a fourth location of the memory 1530. The RS redundancy bits are provided to a fifth location of the memory 1530.

Again, as within other embodiments, if desired, any one, all or combination of the RS symbols that form the first modulation redundancy bits, the second modulation redundancy bits, and the first RS redundancy bits can be provided to a decoder 1540 to make an estimate of at least one bit encoded therein or correct an error within at least one bit included therein. The output of the decoder 1540 can include error corrected symbols or estimates of bit encoded within the symbols.

Several of the previous embodiments depict means by which user information, modulation redundancy bits, and RS redundancy bits are segregated from one another and stored in different regions of a memory. This can provide for a reduction in the hardware complexity of translation between user information and a modulation codeword (e.g., when compared to prior art approaches that generally put the redundancy bits in the same place as the date, or the redundancy bits corresponding to each portion of user information is immediately next to/adjacent to its particular scrambled user information portion).

Moreover, this segregation also provides for the ability to perform correction of only one of the scrambled user information, the modulation redundancy bits, or the RS redundancy bits. In other words, an entire RS codeword need not be read from memory, each component thereof re-assembled, and then undergo decoding to correct for an error within only one component of the RS codeword. Only the particular field (or bits) needs to be accessed to perform correction thereon.

Figure 16:
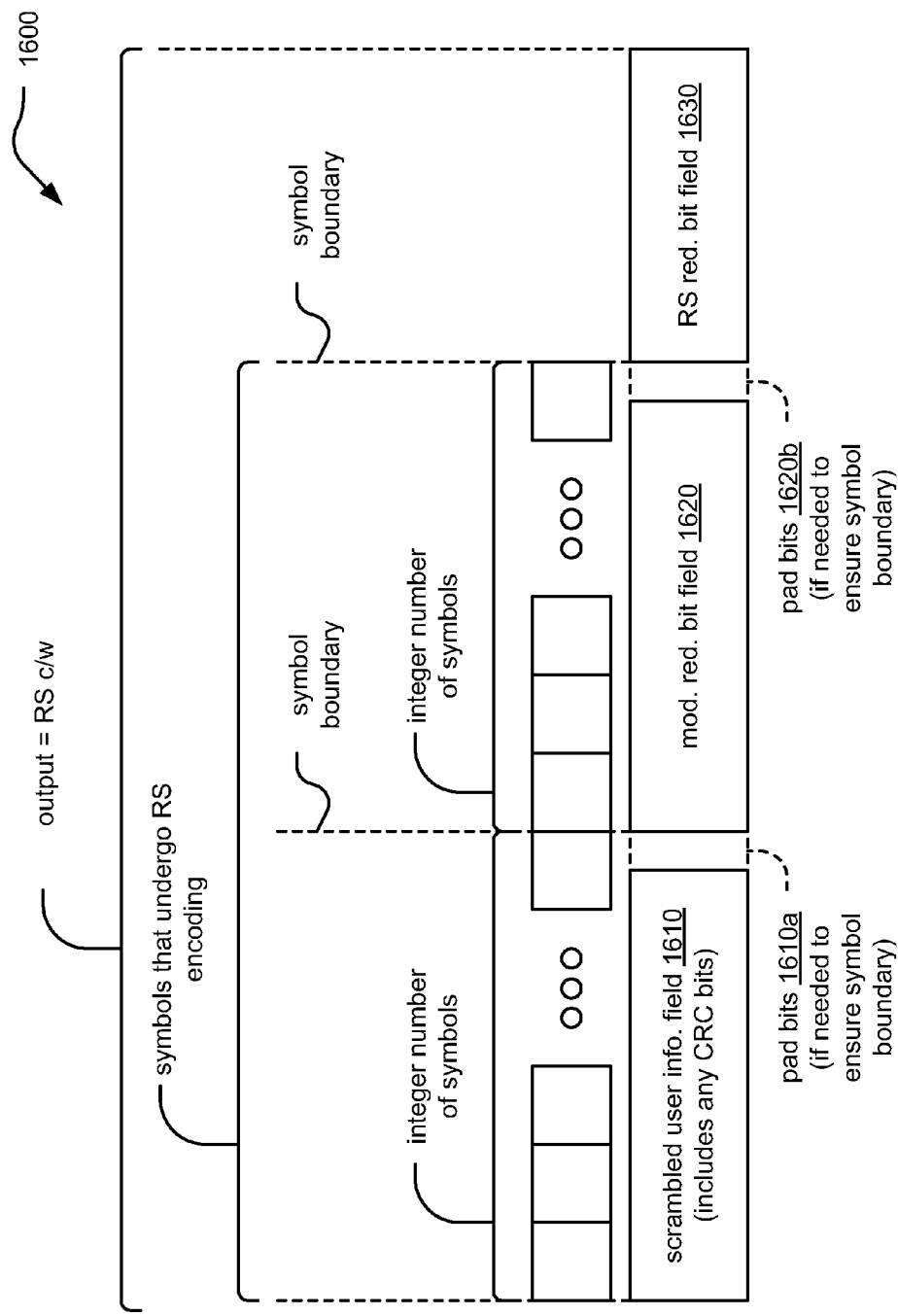
FIG. 16 illustrates an embodiment of a RS codeword depicting the components thereof.

FIG. 16 illustrates an embodiment 1600 of a RS codeword depicting the components thereof. The RS codeword includes a number of sub-portions therein. For example, a scrambled user information field 1610 (which also includes any cyclic redundancy check (CRC) bits encoded therein) and a modulation redundancy scrambled field 1620 are followed by a RS redundancy bit field 1630.

The scrambled user information field 1610 includes an integer number of symbols and can sometimes include pad bits 1610*a* (if needed) to ensure that the scrambled user information field 1610 ends on a symbol boundary. These pad bits 1610*a* can be any desired type of bits (e.g., all 0s, all 1s, or any combination thereof) to ensure that the scrambled user information field 1610 ends on a symbol boundary.

The modulation redundancy scrambled field 1620 includes an integer number of symbols and can sometimes include pad bits 1620*a* (if needed) to ensure that the modulation redundancy scrambled field 1620 ends on a symbol boundary. These pad bits 1620*a* can be any desired type of bits (e.g., all 0s, all 1s, or any combination thereof) to ensure that the scrambled user information field 1610 ends on a symbol boundary.

The 1 or more symbols within each of the scrambled user information field 1610 and the modulation redundancy scrambled field 1620 undergo RS encoding to generate the RS redundancy bit field 1630.

Figure 17:
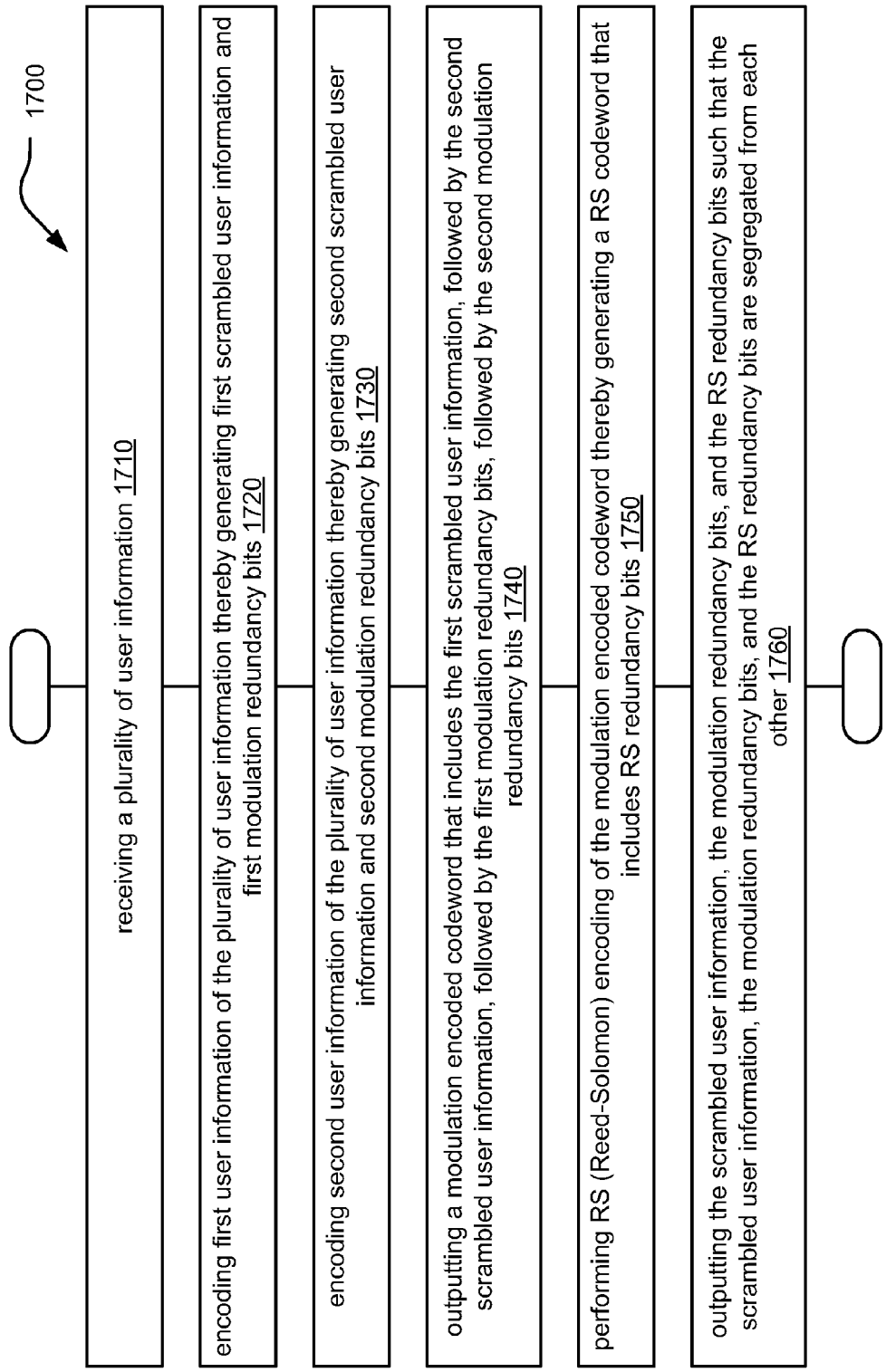
FIG. 17 illustrates an embodiment of a method for perform combined modulation encoding and RS (Reed-Solomon) encoding.

FIG. 17 illustrates an embodiment of a method 1700 for perform combined modulation encoding and RS (Reed-Solomon) encoding. The method 1700 begins by receiving a plurality of user information, as shown in a block 1710. Then, the method 1700 continues by encoding first user information of the plurality of user information thereby generating first scrambled user information and first modulation redundancy bits, as shown in a block 1720. The method 1700 operates by encoding second user information of the plurality of user information thereby generating second scrambled user information and second modulation redundancy bits, as shown in a block 1730. The method 1700 operates by outputting a modulation encoded codeword that includes the first scrambled user information, followed by the second scrambled user information, followed by the first modulation redundancy bits, followed by the second modulation redundancy bits, as shown in a block 1740.

The method 1700 then operates by performing RS (Reed-Solomon) encoding of the modulation encoded codeword thereby generating a RS codeword that includes RS redundancy bits, as shown in a block 1750. In some embodiments, the first scrambled user information and the second scrambled user information form scrambled user information, and the first modulation redundancy bits and the second modulation redundancy bits form modulation redundancy bits. The method 1700 operates by outputting the scrambled user information, the modulation redundancy bits, and the RS redundancy bits such that the scrambled user information, the modulation redundancy bits, and the RS redundancy bits are segregated from each other, as shown in a block 1760.

Figure 18:
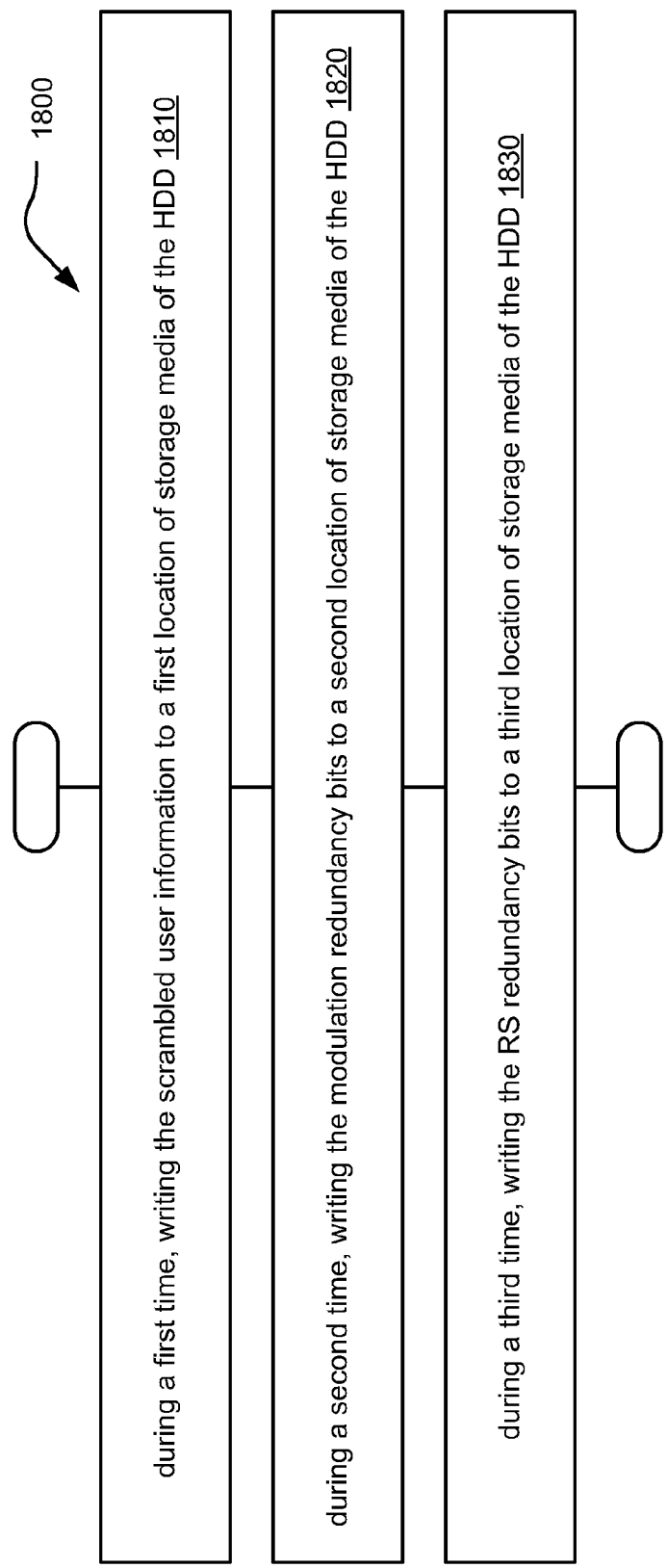
FIG. 18 illustrates an embodiment of a method for writing various segregated components of a RS codeword to a storage media of a HDD.

FIG. 18 illustrates an embodiment of a method 1800 for writing various segregated components of a RS codeword to a storage media of a HDD. The method 1800 operates by writing the scrambled user information to a first location of storage media of the HDD during a first time, as shown in a block 1810. The method 1800 operates by writing the modulation redundancy bits to a second location of storage media of the HDD during a second time, as shown in a block 1820. The method 1800 operates by writing the RS redundancy bits to a third location of storage media of the HDD during a third time, as shown in a block 1830.

Figure 19:
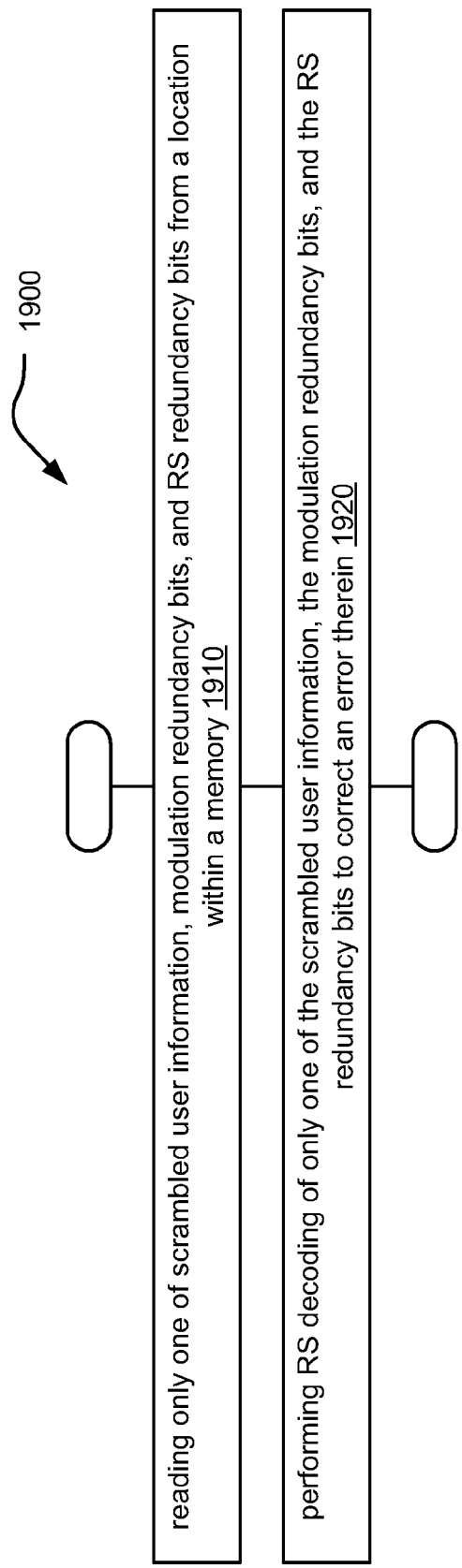
FIG. 19 illustrates an embodiment of a method for reading information from a storage media of a HDD and performing RS decoding thereon.

FIG. 19 illustrates an embodiment of a method 1900 for reading information from a storage media of a HDD and performing RS decoding thereon. The method 1900 operates by reading only one of scrambled user information, modulation redundancy bits, and RS redundancy bits from a location within a memory, as shown in a block 1910. The method then operates by performing RS decoding of only one of the scrambled user information, the modulation redundancy bits, and the RS redundancy bits to correct an error therein, as shown in a block 1920.

The novel approach presented herein provides for reduced area, power, and complexity in the design when compared to prior art approaches. It also provides the feasibility for independent ECC correction of the redundant information bits and the user data. It also provides for a simpler solution for performing corrections in the main buffer after corrupt sectors have been already transferred to the main buffer on disk reads.

In accordance with the novel coding presented herein, redundant bits could be stored in the sector buffer of a HDD following the user data. Alternatively, the redundant bits could be stored in a side buffer and reunited with the data during the disk transfer. If it is stored in the sector buffer, it can be transferred in small increments during the time the data is being transferred into the sector buffer or it can be accumulated and transferred all at once. In some embodiments, the segregated redundant information bits may undergo second modulation coding in the read channel. This second modulation coding may also be performed to the ECC symbols.

It is noted that the various modules (e.g., encoders, decoders, processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An encoder, comprising:
a modulation encoder for:
receiving a plurality of user information; and
encoding first user information of the plurality of user information thereby generating first scrambled user information and first modulation redundancy bits;
encoding second user information of the plurality of user information thereby generating second scrambled user information and second modulation redundancy bits; and
outputting a modulation encoded codeword that includes the first scrambled user information, followed by the second scrambled user information, followed by the first modulation redundancy bits, followed by the second modulation redundancy bits; and
a RS (Reed-Solomon) encoder for encoding the modulation encoded codeword thereby generating a RS codeword that includes RS redundancy bits; and wherein:

the first scrambled user information and the second scrambled user information forming scrambled user information;

the first modulation redundancy bits and the second modulation redundancy bits forming modulation redundancy bits; and the scrambled user information, the modulation redundancy bits, and the RS redundancy bits being output such that the scrambled user information, the modulation redundancy bits, and the RS redundancy bits being segregated from each other.

2. The encoder of claim 1, wherein:

the first scrambled user information and the second scrambled user information being successively written to a first region of a memory;

the first modulation redundancy bits and the second modulation redundancy bits being successively written to a second region of the memory; and the RS redundancy bits being written to a third region of the memory.

3. The encoder of claim 1, wherein:

the first scrambled user information being written to a memory in a first location;

the second scrambled user information being written to the memory in a second location adjacent to the first location;

the first modulation redundancy bits being written to the memory in a third location;

the second modulation redundancy bits being written to the memory in a fourth location adjacent to the third location; and the RS redundancy bits being written to the memory in a fifth location.

4. The encoder of claim 1, wherein:

the scrambled user information, the modulation redundancy bits, and the RS redundancy bits being written to storage media of a hard disk drive (HDD);

the scrambled user information, the modulation redundancy bits, and the RS redundancy bits being read from the storage media of the HDD;

the scrambled user information, the modulation redundancy bits, and the RS redundancy bits forming a read RS codeword; and a decoder performing RS decoding of the read RS codeword for making an estimate of at least one information bit of the plurality of user information encoded therein.

5. The encoder of claim 1, wherein:

the scrambled user information, the modulation redundancy bits, and the RS redundancy bits being written to storage media of a hard disk drive (HDD);

the scrambled user information, the modulation redundancy bits, and the RS redundancy bits being read from the storage media of the HDD;

the scrambled user information, the modulation redundancy bits, and the RS redundancy bits forming a read RS codeword; and a decoder performing RS decoding of the read RS codeword for correcting an error within at least one of the scrambled user information, the modulation redundancy bits, and the RS redundancy bits.

6. The encoder of claim 1, wherein:

the scrambled user information, the modulation redundancy bits, and the RS redundancy bits being written to storage media of a hard disk drive (HDD);

only one of the scrambled user information, the modulation redundancy bits, and the RS redundancy bits being read from the storage media of the HDD; and a decoder performing RS decoding of the read one of the scrambled user information, the modulation redundancy bits, and the RS redundancy bits for correcting an error therein.

7. The encoder of claim 1, wherein:

the plurality of user information being provided to the encoder from a first location within an arbitrated sector buffer implemented within a hard disk drive (HDD); and the scrambled user information, the modulation redundancy bits, and the RS redundancy bits being provided to a second location within the arbitrated sector buffer implemented within the HDD.

8. The encoder of claim 1, wherein:

the scrambled user information, the modulation redundancy bits, and the RS redundancy bits being provided to an arbitrated sector buffer implemented within a hard disk drive (HDD);

during a first time, the scrambled user information being output from the arbitrated sector buffer and written to a first location of storage media of the HDD;

during a second time, the modulation redundancy bits being output from the arbitrated sector buffer and written to a second location of storage media of the HDD; and during a third time, the RS redundancy bits being output from the arbitrated sector buffer and written to a third location of storage media of the HDD.

9. The encoder of claim 1, wherein:

the scrambled user information, the modulation redundancy bits, and the RS redundancy bits being provided to an arbitrated sector buffer implemented within a hard disk drive (HDD);

during a first time, a first portion of the scrambled user information being output from the arbitrated sector buffer and written to a first location of storage media of the HDD;

during a second time, a second portion of the scrambled user information being output from the arbitrated sector buffer and written to a second location of storage media of the HDD;

during a third time, a first portion of the modulation redundancy bits being output from the arbitrated sector buffer and written to a third location of storage media of the HDD;

during a fourth time, a second portion of the modulation redundancy bits being output from the arbitrated sector buffer and written to a fourth location of storage media of the HDD;

during a fifth time, a first portion of the RS redundancy bits being output from the arbitrated sector buffer and written to a fifth location of storage media of the HDD; and during a sixth time, a second portion of the RS redundancy bits being output from the arbitrated sector buffer and written to a sixth location of storage media of the HDD.

10. The encoder of claim 1, wherein:

the scrambled user information, the modulation redundancy bits, and the RS redundancy bits being provided to storage media of a hard disk drive (HDD).

11. The encoder of claim 1, wherein:

the plurality of user information being provided from a host device coupled to a hard disk drive (HDD); and the scrambled user information, the modulation redundancy bits, and the RS redundancy bits being provided to storage media of the HDD.

12. An encoder, comprising:

a modulation encoder for:

receiving a plurality of user information from an arbitrated sector buffer implemented within a hard disk drive (HDD); and
encoding first user information of the plurality of user information thereby generating first scrambled user information and first modulation redundancy bits;
encoding second user information of the plurality of user information thereby generating second scrambled user information and second modulation redundancy bits; and
outputting a modulation encoded codeword that includes the first scrambled user information, followed by the second scrambled user information, followed by the first modulation redundancy bits, followed by the second modulation redundancy bits; and
a RS (Reed-Solomon) encoder for encoding the modulation encoded codeword thereby generating a RS codeword that includes RS redundancy bits; and wherein:
the first scrambled user information and the second scrambled user information forming scrambled user information;
the first modulation redundancy bits and the second modulation redundancy bits forming modulation redundancy bits;
the scrambled user information, the modulation redundancy bits, and the RS redundancy bits being provided to an arbitrated sector buffer such that the scrambled user information, the modulation redundancy bits, and the RS redundancy bits being segregated from each other within the arbitrated sector buffer; and
the scrambled user information, the modulation redundancy bits, and the RS redundancy bits being provided from the arbitrated sector buffer and written to storage media of the HDD.

13. The encoder of claim 12, wherein:
the scrambled user information, the modulation redundancy bits, and the RS redundancy bits being read from the storage media of the HDD;
the scrambled user information, the modulation redundancy bits, and the RS redundancy bits forming a read RS codeword; and
a decoder performing RS decoding of the read RS codeword for making an estimate of at least one information bit of the plurality of user information encoded therein.

14. The encoder of claim 12, wherein:
the scrambled user information, the modulation redundancy bits, and the RS redundancy bits being read from the storage media of the HDD;
the scrambled user information, the modulation redundancy bits, and the RS redundancy bits forming a read RS codeword; and
a decoder performing RS decoding of the read RS codeword for correcting an error within at least one of the scrambled user information, the modulation redundancy bits, and the RS redundancy bits.

15. The encoder of claim 12, wherein:
only one of the scrambled user information, the modulation redundancy bits, and the RS redundancy bits being read from the storage media of the HDD; and
a decoder performing RS decoding of the read one of the scrambled user information, the modulation redundancy bits, and the RS redundancy bits for correcting an error therein.

16. The encoder of claim 12, wherein:
during a first time, the scrambled user information being output from the arbitrated sector buffer and written to a first location of the storage media of the HDD;
during a second time, the modulation redundancy bits being output from the arbitrated sector buffer and written to a second location of storage media of the HDD; and
during a third time, the RS redundancy bits being output from the arbitrated sector buffer and written to a third location of storage media of the HDD.

17. The encoder of claim 12, wherein:
during a first time, the scrambled user information being output from the arbitrated sector buffer and written to a first location of storage media of the HDD;
during a second time, the modulation redundancy bits being output from the arbitrated sector buffer and written to a second location of storage media of the HDD; and
during a third time, the RS redundancy bits being output from the arbitrated sector buffer and written to a third location of storage media of the HDD.

18. A method, comprising:
receiving a plurality of user information;
encoding first user information of the plurality of user information thereby generating first scrambled user information and first modulation redundancy bits;
encoding second user information of the plurality of user information thereby generating second scrambled user information and second modulation redundancy bits;
outputting a modulation encoded codeword that includes the first scrambled user information, followed by the second scrambled user information, followed by the first modulation redundancy bits, followed by the second modulation redundancy bits;
performing RS (Reed-Solomon) encoding of the modulation encoded codeword thereby generating a RS codeword that includes RS redundancy bits, wherein the first scrambled user information and the second scrambled user information form scrambled user information, and the first modulation redundancy bits and the second modulation redundancy bits form modulation redundancy bits; and
outputting the scrambled user information, the modulation redundancy bits, and the RS redundancy bits such that the scrambled user information, the modulation redundancy bits, and the RS redundancy bits are segregated from each other.

19. The method of claim 18, further comprising:
performing RS decoding of only one of the scrambled user information, the modulation redundancy bits, and the RS redundancy bits to correct an error therein.

20. The method of claim 18, further comprising:
during a first time, writing the scrambled user information to a first location of storage media of the HDD;
during a second time, writing the modulation redundancy bits to a second location of storage media of the HDD; and
during a third time, writing the RS redundancy bits to a third location of storage media of the HDD.

* * * * *